(12) United States Patent
Kohara

(10) Patent No.: US 8,333,665 B2
(45) Date of Patent: Dec. 18, 2012

(54) LUBRICATING SYSTEM, BEARING UTILIZING THE SYSTEM, UNIVERSAL JOINT UTILIZING THE SYSTEM, AND PROCESS FOR PRODUCTION THEREOF

(75) Inventor: Mika Kohara, Iwata (JP)

(73) Assignee: NTN Corporation, Osaka (JP)

( * ) Notice: Subject to any disclaimer, the term of this patent is extended or adjusted under 35 U.S.C. 154(b) by 330 days.

(21) Appl. No.: 12/448,096

(22) PCT Filed: Dec. 11, 2007

(86) PCT No.: PCT/JP2007/073816
§ 371 (c)(1),
(2), (4) Date: Jul. 15, 2009

(87) PCT Pub. No.: WO2008/072607
PCT Pub. Date: Jun. 19, 2008

(65) Prior Publication Data
US 2010/0027929 A1 Feb. 4, 2010

(30) Foreign Application Priority Data

Dec. 11, 2006 (JP) .................. 2006-332971
Dec. 11, 2006 (JP) .................. 2006-332982
Dec. 11, 2006 (JP) .................. 2006-333014
Feb. 26, 2007 (JP) .................. 2007-046217
Feb. 26, 2007 (JP) .................. 2007-046233
Feb. 26, 2007 (JP) .................. 2007-046244
May 1, 2007 (JP) .................. 2007-120787

(51) Int. Cl.
*F16C 1/24* (2006.01)

(52) U.S. Cl. .................................. 464/15; 508/464
(58) Field of Classification Search ............ 464/8, 15; 384/463, 469; 508/464
See application file for complete search history.

(56) References Cited

U.S. PATENT DOCUMENTS 3,190,842 A * 6/1965 Ringwood et al. ........ 508/464 X
4,623,472 A 11/1986 Jamison
(Continued)

FOREIGN PATENT DOCUMENTS

DE 196 15 889 A1 10/1997
(Continued)

OTHER PUBLICATIONS

PCT Search Report Dated Apr. 1, 2008.

*Primary Examiner* — Gregory Binda
(74) *Attorney, Agent, or Firm* — Hedman & Costigan, P.C.; James V. Costigan

(57) ABSTRACT

A lubricating having a foam lubricant that minimizes exudation of the lubricating component caused by deformation of the foam lubricant, is excellent in initial lubrication, has a long life, has a low cost, and is excellent in the productivity thereof; a bearing utilizing the lubricating system; a universal joint utilizing the lubricating system; and a process for the production thereof. A lubricating system includes a foam lubricant (9) containing a lubricating component in a resin thereof which foams, hardens, and becomes porous and a lubricant (10) for initial lubrication which is present together with the foam lubricant (9) in a portion to be lubricated. The lubricant (10) for initial lubrication consists of grease having a worked penetration not less than 300 or having a degree of oil separation not less than 0.7 wt % when the grease is left 24 hours at 70° C.

16 Claims, 17 Drawing Sheets

U.S. PATENT DOCUMENTS

| | | |
|---|---|---|
| 5,588,751 A | 12/1996 | Nakata |
| 2003/0022797 A1 | 1/2003 | Oohira et al. |

FOREIGN PATENT DOCUMENTS

| | | | |
|---|---|---|---|
| EP | 0 836 023 A1 | | 4/1998 |
| EP | 1 008 777 A2 | | 6/2000 |
| EP | 1 691 091 A1 | | 8/2006 |
| JP | 10-274245 A | | 10/1988 |
| JP | 06-41569 A | | 2/1994 |
| JP | 06-172770 A | | 6/1994 |
| JP | 06-173961 A | | 6/1994 |
| JP | 09-42297 A | | 2/1997 |
| JP | 10-158682 A | * | 6/1998 |
| JP | 11-286601 A | | 10/1999 |
| JP | 2000-319681 A | | 11/2000 |
| JP | 2002-129183 A | | 5/2002 |
| JP | 2006-77073 A | | 3/2006 |
| JP | 2007-177226 A | | 7/2007 |
| JP | 2007-247887 A | | 9/2007 |
| WO | WO 2007/063881 A1 | | 6/2007 |

* cited by examiner

LUBRICATING SYSTEM, BEARING UTILIZING THE SYSTEM, UNIVERSAL JOINT UTILIZING THE SYSTEM, AND PROCESS FOR PRODUCTION THEREOF

TECHNICAL FIELD

The present invention relates to a lubricating system capable of supplying a lubricant to a sliding portion and the like of a machine with a foam lubricant and a lubricant for initial lubrication consisting of grease or lubricating oil present together, a bearing utilizing the lubricating system, a universal joint utilizing the lubricating system, and a process for the production thereof.

BACKGROUND ART

Generally a lubricant is used at a sliding portion and a rotational portion of a bearing and the like used for cars and machines represented by industrial machines.

Normally grease is filled inside a rolling bearing to lubricate frictional surfaces between rolling elements thereof and inner and outer rings thereof as well as a cage thereof. To prevent the grease filled inside the rolling bearing from flowing to the outside and dust and water from penetrating thereinto, the rolling bearing is provided with a sealing apparatus. But it is difficult to completely enclose the grease in the rolling bearing even in the rolling bearing provided with the sealing apparatus. When the rolling bearing is used for a long time, there is a possibility that the grease gradually flows out and gradually deteriorates due to water which has penetrated thereinto from outside.

The lubricant is classified into a liquid lubricant and a solid lubricant. To solve the problem of the defective sealing of the grease and the problem of the method of preventing the deterioration thereof, grease having a configuration-holding performance brought about by thickening lubricating oil and a solid lubricant retaining the liquid lubricant and thus capable of preventing the liquid lubricant from scattering and dripping are known.

For example, the solid lubricant having the property formed by mixing ultra-high-molecular-weight polyolefin or urethane resin and hardener for it with lubricating oil or grease so that the liquid lubricating component gradually exudes with the liquid lubricating component kept retained between molecules of the resin is known (see patent documents 1 through 3).

The self-lubricating polyurethane elastomer formed by allowing a reaction between polyol and diisocyanate which are polyurethane materials in the lubricating component in the presence of the lubricant is also known (see patent document 4).

When these solid lubricants are solidified by enclosing them in the bearing, the lubricating oil gradually exudes therefrom. These solid lubricants are intended to eliminate the need for maintenance for replenishing the lubricating oil and contribute to the prolongation of the life of the bearing in a strict environment where a large amount of water is present and an environment where a high inertial force acts.

But the rolling bearing having the conventional solid lubricant filled therein has a disadvantage that the rolling bearing cannot be used because it has a short life, is liable to have seizing in a high-speed rotation, and fuses the matrix consisting of the resin component owing to the generation of heat. A full-pack specification has a problem that in the process of cooling the above-described solid lubricant solidified in the bearing, the lubricant itself surrounds tightly the rolling elements because the solid lubricant contracts and thus the rotational torque is liable to become high and heat is liable to be generated.

In recent years, technical improvement for allowing cars to have a high performance, be compact, and be light weight has progressed. The process of the present invention for producing a universal joint includes the steps of enclosing the lubricant for initial lubrication inside the universal joint; filling a mixture essentially containing a resin which foams, hardens, and becomes porous and a lubricating component inside the universal joint in which the lubricant for initial lubrication is enclosed and foaming and hardening the mixture to form the foam lubricant. Therefore there is a growing demand for research and development of new lubricants and lubricating mechanisms.

But when the solid lubricant is used at portions such as the driving portion of the constant velocity universal joint where an external force such as compression, flexure, and the like is repeatedly applied at a high frequency, a very large force is necessary to deform the solid lubricant in conformity to the compression, flexure, and the like or a very high stress is applied to the solid lubricant, therefore a portion retaining the solid lubricant requires a high mechanical strength.

But the strength of the solid lubricant and the filling rate thereof make compensation for each other. Therefore it is difficult to retain the solid lubricant at a high filling rate. Thus there is a possibility of preventing the constant velocity universal joint from having a long life.

Therefore there is a demand for the development of a solid lubricant which can be easily used at the portion to which the external force such as compression, flexure, and the like is repeatedly applied at a high frequency.

As an example of the solid lubricant for complying with such a demand, the known solid lubricant is used by impregnating the lubricating oil into the flexible resin foamed to form communicating pores and filling the foam lubricant retaining the lubricating oil in the communicating pores in the bearing and the constant velocity universal joint (see patent document 5). The foam lubricant is compressed in conformity to the boot which is deformed by the flexure of the universal joint. The liquid lubricant which has exuded from the foam lubricant is supplied to a necessary portion to allow preferable lubrication.

But the solid lubricant disclosed in the patent documents 1 through 4 have a high force of retaining the lubricating component such as the lubricating oil and grease, but lack in a flexible deformability. The method of preparing the foam lubricant disclosed in the patent document 5 in the communicating pores is of a later-impregnation type, that is, impregnating the foamed resin with the lubricating oil. When the above-described solid lubricant is used, it has a low lubricating oil-retaining force because the lubricating oil is not contained in the solid component. Thus when the solid lubricant is used for the bearing or the universal joint in a high-speed operation condition, there is a possibility that the lubricating oil exudes rapidly from the foamed resin and runs dry. The above-described foam lubricant can be used for lubrication in a short period of time and in a closed space. But when the foam lubricant is used at a portion which requires long-time lubrication or in an open space, the lubricating oil is insufficiently supplied. When the foam lubricant has a low lubricating oil-retaining force, an excess of the lubricating oil is repeatedly discharged from the pores and absorbed thereto, thus always flowing in the space. In such a case, in dependence on the chemical property of the lubricant and an additive contained therein, there is a possibility that they attack and deteriorate the boot material of the universal joint. Thus the foam lubricant is defective in that the material of the boot is limited to a specific kind or the materials of the lubricant and/or the additive are limited to specific kinds. In addition, there is a later impregnation-caused increase in the number of production steps, an increase in the production period of time, and consequently an increase in the production cost.

For the above-described reason, there is a demand for the development of the lubricant, for use in the bearing and the constant velocity universal joint, having a high force of retaining the lubricating component such as the lubricating oil and the grease and a high extent of deformation. It is particularly necessary for a solid component to contain the lubricating component to enhance the force of retaining the lubricating component.

The foam lubricant in which the lubricating component is contained in the solid component to enhance the force of retaining the lubricating component can be supplied in a necessary amount and to a necessary portion better than grease lubrication industrially widely used. Therefore the art of allowing the solid component to contain the lubricating component therein has advantages of decreasing the cost owing to a decrease in the use amount of grease, decreasing a load to be applied to the material for the boot, decreasing the weight of the constant velocity universal joint, and making the constant velocity universal joint compact. Thus it can be said that this art is high in the degree of importance for society from the standpoint of not only an economic side but also decreasing a load to be applied to environment and in addition increasing the degree of freedom in design.

Even in the bearing and the constant velocity universal joint in which the foam lubricant having the above-described many advantages is enclosed, in dependence on the manner of using them, there is a case where an initial discharge amount of the lubricant is small due to an external force and a rise of temperature. In consideration of durability, it is desirable that the discharge amount of the lubricating component from the resin component is set to minimum necessary amount. When the discharge speed of the lubricating component is low, a necessary amount of the lubricating component reaches the sliding portion at a low speed. As a result, at an early stage, the lubricating component runs dry and thereby wear and defective lubrication may occur at the rolling portion and the sliding portion. Thereby owing to damage of a sliding surface, portions to be lubricated may have a short life. Therefore there is a demand for the development of a lubricant capable of supplying the lubricating component such as lubricating oil immediately after lubrication starts.

In conventional methods of filling the solid lubricant such as the foam lubricant inside the constant velocity universal joint and the like, in dependence on the flowability thereof, there is a possibility that the solid lubricant is not filled at a necessary portion, but filled in a portion such as a shaft hole of an inner member unnecessary to be lubricated. When the filling amount is very large, there occurs a problem that because owing to the interruption of the solid lubricant, it is difficult to assemble component parts. Particularly in filling the solid lubricant in an internal gap between the inner member and the outer member, it is necessary to fill the solid lubricant to mainly the peripheries of torque transmission members such as a track portion and raceway surfaces thereof. It is unnecessary to fill the solid lubricant in the shaft hole of the inner member. To fill an appropriate amount of the solid lubricant in the portions to be lubricated, it is necessary to adjust a pressure to be applied to the solid lubricant at a filling time and an extrusion amount. The work of securely accomplishing these operations is troublesome and not easy.

Patent document 1: Japanese Patent Application Laid-Open No. 6-41569
Patent document 2: Japanese Patent Application Laid-Open No. 6-172770
Patent document 3: Japanese Patent Application Laid-Open No. 2000-319681
Patent document 4: Japanese Patent Application Laid-Open No. 11-286601
Patent document 5: Japanese Patent Application Laid-Open No. 9-42297

DISCLOSURE OF THE INVENTION

Problems to be Solved by the Invention

The present invention has been made to cope with the above-described problems. It is an object of the present invention to provide a lubricating system that improves the force of retaining a lubricating component of a foam lubricant, keeps an exudation amount of the lubricating component caused by deformation of the foam lubricant minimum necessary, is excellent in initial lubrication, has a long life, has a low cost, and is excellent in the productivity thereof; a bearing utilizing the lubricating system; a universal joint utilizing the lubricating system; and a process for the production thereof.

Means for Solving the Problems

The lubricating system of the present invention comprises a foam lubricant containing a lubricating component in a resin thereof which foams, hardens, and becomes porous; and a lubricant for initial lubrication which is present together with the foam lubricant in a portion to be lubricated, wherein the lubricant for initial lubrication consists of grease having a worked penetration not less than 300 or having a degree of oil separation not less than 0.7 wt % when the grease is left 24 hours at 70° C. or consists of lubricating oil having a kinematic viscosity not less than 50 mm$^2$/second at 40° C.; and in initial lubrication of the lubricating system, the lubricant for initial lubrication is essentially present at a sliding portion of the portion to be lubricated.

The worked penetration indicates a 60-time mixing worked penetration measured in accordance with JIS K 2220 5.3. The degree of oil separation is a value measured in accordance with the method of measuring the degree of oil separation specified in JIS K 2220 11. The kinematic viscosity is a measured in accordance with JIS K 2283.

The "initial lubrication" in the present invention means lubrication in the period of time from a state in which the lubricating component does not exude to the sliding portion from the foam lubricant immediately after an apparatus which requires lubrication starts to operate to a state in which as a result of the operation of the apparatus, the lubricating component exudes to the sliding portion from the foam lubricant.

The lubricant for initial lubrication in the present invention means a liquid lubricating component or a semisolid lubricating component such as the lubricating oil and the grease present in the portion to be lubricated separately from the foam lubricant and is distinguished from the lubricating component contained in the resin which foams, hardens, and becomes porous in the foam lubricant.

In the foam lubricant, the resin which foams, hardens, and becomes porous is a rubber-like elastic substance; and the lubricating component contained in the resin has an exuding property displayed by deformation of the rubber-like elastic substance.

The resin which foams, hardens, and becomes porous is polyurethane resin.

A open cell ratio of the resin which foams, hardens, and becomes porous is not less than 50%.

A foaming magnification of the resin is 1.1 to 100.

In the universal joint of the present invention, the above-described lubricating system is utilized. In the universal joint, a rotational torque is transmitted owing to engagement between track grooves and torque transmission members provided on an outer member and an inner member; the torque transmission members roll along the track grooves to allow the torque transmission members to move in an axial direction; and the foam lubricant and the lubricant for initial lubrication are present together in the inside of the universal joint, which is a portion to be lubricated, and in initial lubrication of the universal joint, the lubricant for initial lubrication is present in a rolling portion of the universal joint or a sliding portion thereof. The universal joint is a constant velocity universal joint.

The process of the present invention for producing a universal joint according to claim 6, includes the steps of enclosing the lubricant for initial lubrication inside the universal joint; filling a mixture essentially containing a resin which foams, hardens, and becomes porous and a lubricating component inside the universal joint in which the lubricant for initial lubrication is enclosed; and foaming and hardening the mixture to form the foam lubricant.

At the step of enclosing the lubricant for initial lubrication inside the universal joint, the lubricant for initial lubrication is enclosed at a bottom portion of the outer member. At the foaming and hardening step, the mixture is filled between the outer member and the inner member from a shaft hole of the inner member of the universal joint; and after the shaft hole of the inner member is closed by a shaft or a shaft-shaped stopper, the mixture is foamed and hardened to form the foam lubricant.

Other process of the present invention for producing a universal joint includes the steps of filling a mixture essentially containing a resin which foams, hardens, and becomes porous and a lubricating component inside the universal joint; foaming and hardening the mixture to form the foam lubricant; and injecting the lubricant for initial lubrication inside the universal joint.

At the step of injecting the lubricant for initial lubrication inside the universal joint, the lubricant for initial lubrication is injected into a space formed through a shaft hole of the inner member by removing the stopper after the foaming and hardening step finishes.

The stopper has a flange covering an end of the outer member at an open side thereof. An air hole is formed through the flange.

In the bearing of the present invention utilizing the above-described lubricating system, the foam lubricant and the lubricant for initial lubrication are present together in the inside of the bearing, which is a portion to be lubricated; and in initial lubrication of the bearing, the lubricant for initial lubrication is present at a rolling portion of the bearing or a sliding portion thereof. The above-described bearing is a rolling bearing.

Effect of the Invention

The lubricating system of the present invention includes the foam lubricant containing the lubricating component in the resin thereof which foams, hardens, and becomes porous; and the lubricant for initial lubrication, consisting of the grease or the lubricating oil having the predetermined property, which is present together with the foam lubricant in the portion to be lubricated. In the initial lubrication of the lubricating system, the lubricant for initial lubrication is essentially present at the sliding portion of the portion to be lubricated. Therefore in the initial lubrication, namely, until the lubricating component sufficiently exudes from the foam lubricant, the lubricant for initial lubrication is present at the sliding portion, thereby contributing to the lubrication. In addition, after the initial lubrication terminates, the lubricating function can be continuously accomplished by the lubricating component which exudes from the foam lubricant.

Consequently the lubricating system is capable of performing lubricating function sufficiently and continuously at the rolling portion or the sliding portion of the bearing, the universal joint, and the like from the time of the initial lubrication. Therefore the lubricating system of the present invention is adaptable in the initial lubrication and capable of satisfying a demand for the development of the bearing, the universal joint, and the like having a long life and a low cost.

The lubricant for initial lubrication consists of the grease having the worked penetration not less than 300 or having the degree of oil separation not less than 0.7 wt % when the grease is left 24 hours at 70° C. Therefore at the initial lubrication time, the lubricant for initial lubrication moves easily to the rolling portion or the sliding portion.

The lubricant for initial lubrication consists of the lubricating oil having the kinematic viscosity not less than 50 mm$^2$/second at 40° C. Therefore at the initial lubrication time, the lubricant for initial lubrication moves easily to the rolling portion or the sliding portion and stays at these portions.

The foam lubricant used in the present invention is a solid substance formed by foaming and hardening the resin and making it porous. When the resin foams and hardens, the lubricating component is held in the resin. Therefore compared with a case in which the lubricating component is impregnated into the foamed resin obtained by foaming and hardening only the resin, the holding amount of the lubricating component in the foam lubricant is more than the holding amount of the lubricating component impregnated into only pores. In addition, in operating the bearing, the universal joint, and the like utilizing the lubricating system of the present invention, the lubricating component is gradually exuded from the foam lubricant to the periphery and the like of the sliding portion thereof to be lubricated. Therefore it is possible to operate the bearing, the universal joint, and the like in a high-speed rotation.

In the initial lubrication, the lubricant for initial lubrication consisting of the grease or the lubricating oil is capable of acting as the lubricant. Therefore it is possible to set the exuding speed of the lubricating component which exudes from the foam lubricant lower than a speed thereof set in a case in which the lubricant for initial lubrication is not present together with the foam lubricant. Therefore it is possible to stably supply the sliding portion with a minimum necessary lubricating component for a longtime and prolong the life of the bearing, the universal joint, and the like utilizing the lubricating system of the present invention.

By filling the foam lubricant inside the bearing, the universal joint, and the like, the lubricant is capable of being present in the vicinity of the rolling portion or the sliding portion of the bearing, the universal joint, and the like utilizing the lubricating system of the present invention. Therefore the lubricant can be supplied to the sliding portions more easily and sufficiently than lubrication performed by using only the grease or the lubricating oil. In addition, because the foam lubricant has a lot of porous portions, it is possible to make the bearing, the universal joint, and the like utilizing the lubricating system of the present invention lightweight.

The process of the present invention for producing the universal joint includes the steps of enclosing the lubricant for initial lubrication inside the universal joint, for example, at the bottom portion of the outer member; filling the mixture essentially containing the resin which foams, hardens, and becomes porous and the lubricating component inside the universal joint in which the lubricant for initial lubrication is enclosed; and foaming and hardening the mixture to form the foam lubricant. Alternatively the process of the present invention for producing the universal joint includes the steps of filling a mixture essentially containing a resin which foams, hardens, and becomes porous and a lubricating component inside the universal joint; foaming and hardening the mixture to form the foam lubricant; and injecting the lubricant for initial lubrication inside the universal joint.

Therefore it is possible to enclose the lubricant for initial lubrication inside the universal joint and foam and harden the foam lubricant inside the universal joint. In addition, it is unnecessary to use a die for molding the foam lubricant and enclose the lubricant for initial lubrication and the foam lubricant inside the universal joint after it is assembled from parts. Thus the process of the present invention is excellent in an assembling operation. Consequently it is possible to improve the production efficiency and thus produce the universal joint at a low cost.

At the foaming and hardening step, the mixture is filled between the outer member and the inner member from the shaft hole of the inner member of the universal joint; and the shaft hole of the inner member is closed by the shaft or the shaft-shaped stopper and the mixture is foamed and hardened to form the foam lubricant. Therefore as the stopper of the shaft hole of the inner member, by adopting the stopper having the flange covering the end of the outer member at the open side thereof, it is possible to fill the mixture for obtaining the foam lubricant in every nook and corner of the sliding portion such as the track portion and the like to be lubricated and foam and harden the mixture in a state that the end surface open at the side opposite to the axis of the outer member is covered. Thus it is possible to enhance the filling ratio of the foam lubricant inside the universal joint.

The stopper having the flange covering the end of the outer member at the open side thereof is mounted on the shaft hole, and the air hole for air release is formed through the flange in the thickness direction of the flange. Thereby in foaming and hardening the mixture containing the resin and the lubricating component essentially, the air inside the universal joint can be released to the outside from the air hole of the flange, even though the internal pressure of the universal joint rises owing to the expansion caused by the foaming of the mixture. Thereby even though the internal pressure of the universal joint rises, it is possible to prevent the stopper inserted into the shaft hole of the inner member from slipping out of the shaft hole. In addition, it is possible to fill the foamed and hardened foam lubricant to every nook and corner and sufficiently lubricate the necessary portion without staying air and a gas required for foaming inside the flange.

Figure 1:
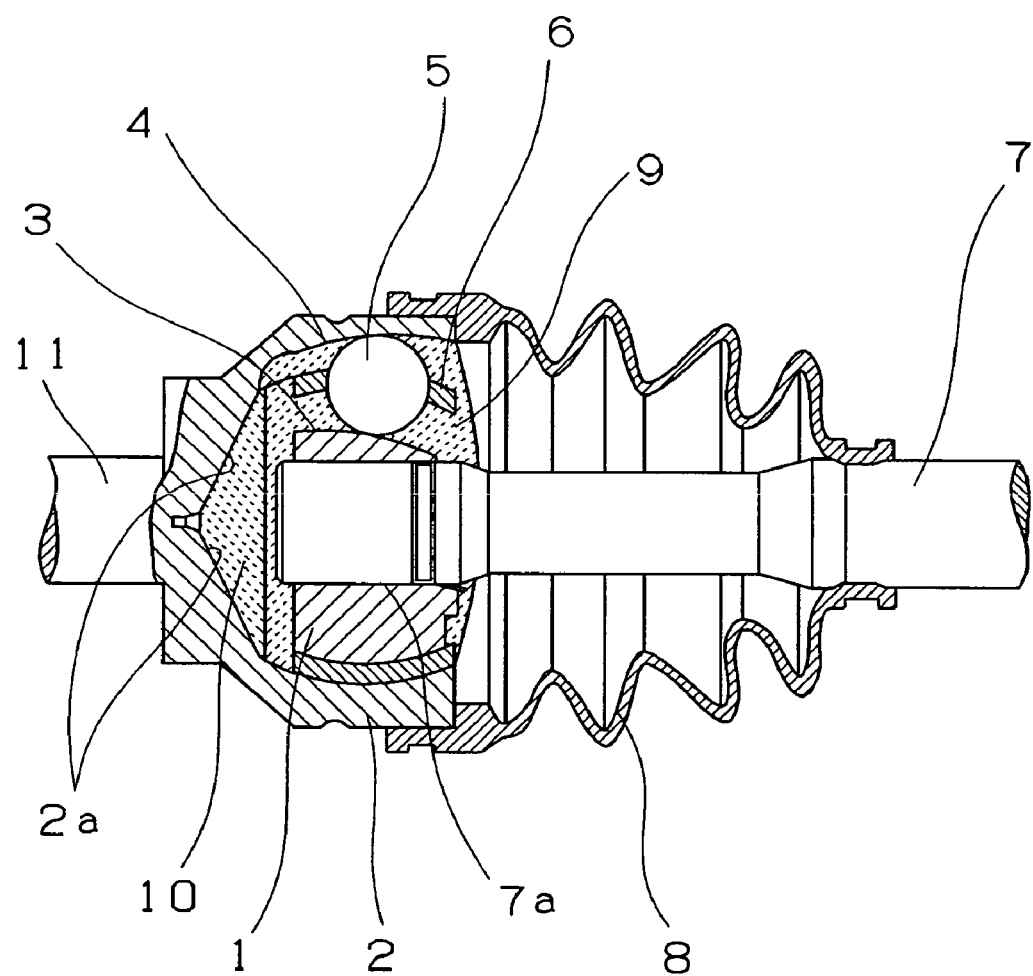
FIG. 1 is a sectional view showing a constant velocity universal joint utilizing the lubricating system of the present invention.

EXPLANATION OF REFERENCE NUMERALS AND SYMBOLS 1, 101, 202: inner member
2, 102, 202, 302: outer member
2a: bottom portion of outer member
3, 103, 203: inner member-side track groove
4, 104, 204, 304: outer member-side track groove
5, 105, 205: torque transmission member (steel balls)
6, 106, 206: cage
6a, 106a, 206a: cage window
7, 107, 307: shaft
7a, 107a, 207a, 307a: shaft hole
8: boot
9: foam lubricant
9a: mixture of components of foam lubricant
10: lubricant for initial lubrication (grease for initial lubrication or lubricating oil for initial lubrication)
11: shaft of outer member
12: stopper 13, 14: stopper
13a, 14a: flange
15: air hole
16: gap (air hole)
207: stub shaft
238: end plate
301: tripod member (inner member)
315: roller
316: journal
401, 411: radial ball bearing
402, 412, 422, 432: inner ring
403, 413, 423, 433: outer ring
404, 414, 424, 434: ball (rolling element)
405: iron plate
406, 416, 426: mixture of components of foam lubricant
407: outer diameter of bearing
415, 435: sealing member
421: thrust ball bearing
425: die
427: cylindrical jig
428: foam lubricant
431: deep groove ball bearing
436: cage
437: lubricant for initial lubrication (grease for initial lubrication or lubricating oil for initial lubrication)
438: foam lubricant

BEST MODE FOR CARRYING OUT THE INVENTION

Figure 2:
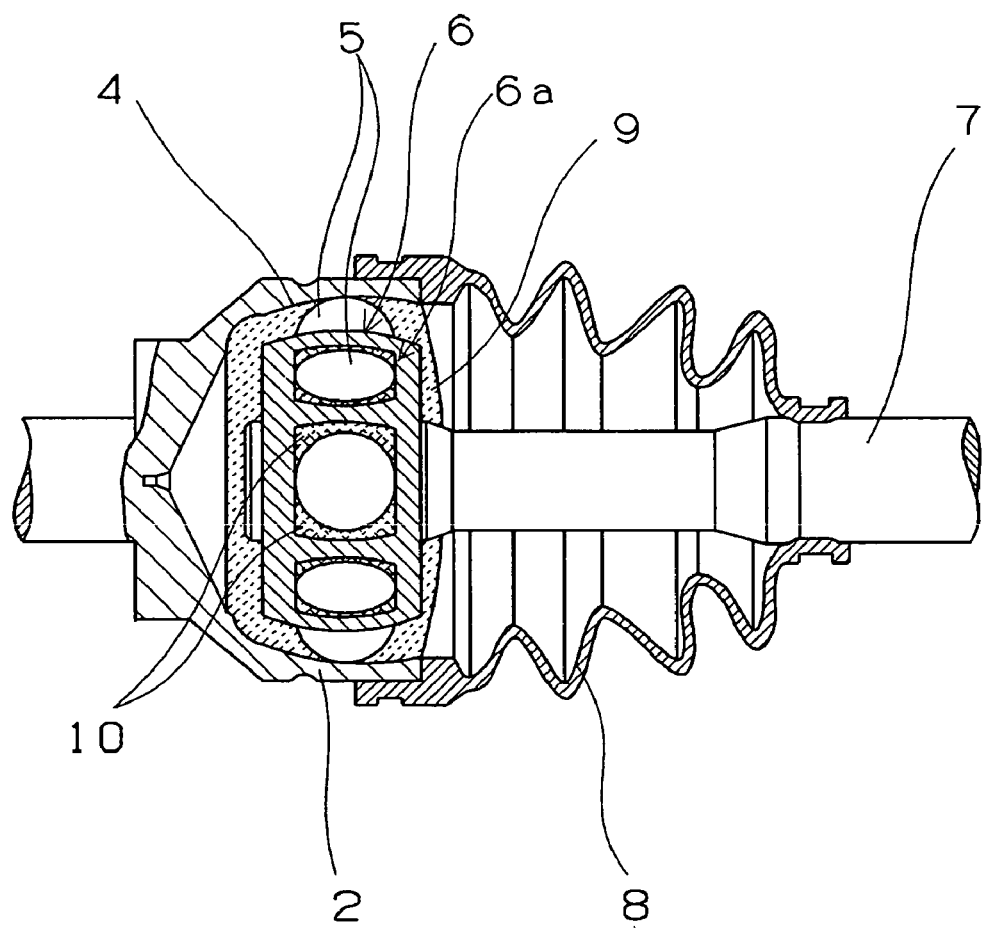
FIG. 2 is a sectional view showing another constant velocity universal joint utilizing the lubricating system of the present invention.
Figure 3:
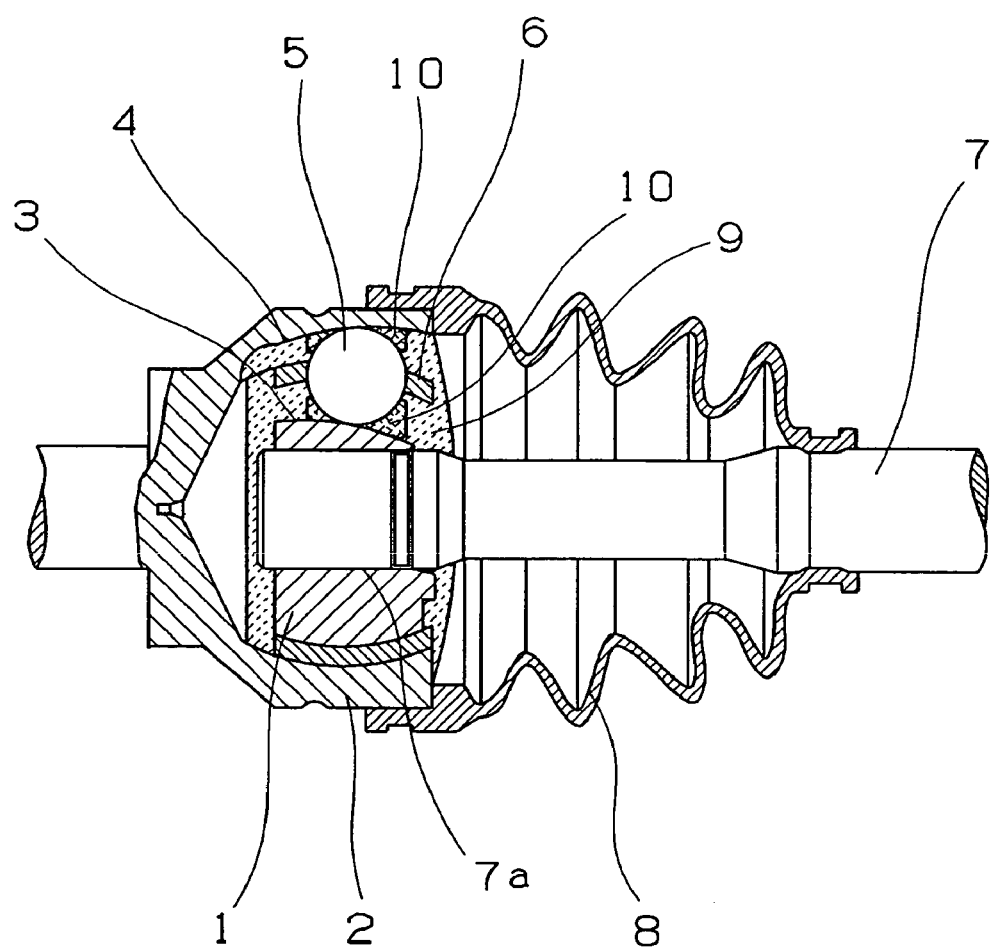
FIG. 3 is a sectional view showing another constant velocity universal joint utilizing the lubricating system showing of the present invention.

A case in which the lubricating system of the present invention is applied to a constant velocity universal joint is exemplified to concretely describe the action of a foam lubricant and that of a lubricant for initial lubrication. FIGS. 1 through 3 show an embodiment in which the present invention is applied to a ball-fixed type constant velocity universal joint (herein after often referred to as BJ) which is one of a fixed type constant velocity universal joint.

FIG. 1 is a sectional view showing a constant velocity universal joint utilizing the lubricating system of the present invention. As shown in FIG. 1, the constant velocity universal joint is constructed of an inner member (inner ring) 1, an outer member (outer ring) 2, an inner member-side track groove 3, an outer member-side track groove 4, torque transmission members (steel balls) 5, a cage 6, a shaft 7, a boot 8, a foam lubricant 9, a lubricant 10 for initial lubrication, and accessories. The inner member 1 has a shaft hole 7a into which the shaft 7 constructing a shaft member is inserted from an open side of the outer member 2. At this time, the lubricant 10 for initial lubrication is enclosed at a bottom portion 2a of the outer member 2, where as the foam lubricant 9 and the lubricant 10 for initial lubrication are present together in the inside of the constant velocity universal joint, which is a portion to be lubricated with the foam lubricant 9 disposed in the vicinity of the torque transmission member 5.

FIG. 2 is a sectional view showing another constant velocity universal joint utilizing the lubricating system of the present invention. As shown in FIG. 2, the constant velocity universal joint is constructed of the inner member (not shown), the outer member (outer ring) 2, the inner member-side track groove (not shown), the outer member-side track groove 4, the torque transmission members (steel balls) 5, the cage 6 having eight cage windows 6a, the shaft 7, the boot 8, the foam lubricant 9, the lubricant 10 for initial lubrication, and accessories. The inner member 1 has the shaft hole (not shown) into which the shaft 7 constructing the shaft member is inserted from the open side of the outer member 2. At this time, the lubricant 10 for initial lubrication is accommodated in a portion of the cage window 6a in the vicinity of the torque transmission member 5, where as the foam lubricant 9 and the lubricant 10 for initial lubrication are present together in the inside of the constant velocity universal joint which is a portion to be lubricated, with the foam lubricant 9 disposed in a space surrounded with the outer member-side track groove 4 in a rotational direction on which the torque transmission member 5 slides.

FIG. 3 is a sectional view showing another constant velocity universal joint utilizing the lubricating system of the present invention. As shown in FIG. 3, the constant velocity universal joint is constructed of the inner member (not shown) 1, the outer member (outer ring) 2, the inner member-side track groove 3, the outer member-side track groove 4, the torque transmission members (steel balls) 5, the cage 6, the shaft 7, the boot 8, the foam lubricant 9, the lubricant 10 for initial lubrication, and accessories. The inner member 1 has the shaft hole 7a into which the shaft 7 constructing the shaft member is inserted from the open side of the outer member 2. At this time, the lubricant 10 for initial lubrication is disposed in a track portion in the vicinity of the torque transmission member 5, where as the foam lubricant 9 and the lubricant 10 for initial lubrication are present together in the inside of the constant velocity universal joint, which is a portion to be lubricated, with the foam lubricant 9 disposed in the space surrounded with the outer member-side track groove 4 in the rotational direction on which the torque transmission member 5 slides.

The foam lubricant 9 contains a lubricating component in resin thereof which foams, hardens, and becomes porous. The lubricating component gradually exudes from the foam lubricant to sliding portions constructed of the inner member-side track groove 3, the outer member-side track groove 4, the surface of the torque transmission member 5, and the surface of the cage 6 owing to external stresses such as compression, flexure, and expansion which occur when a centrifugal force is generated by a rotational motion of the constant velocity universal joint or when the constant velocity universal joint forms a large operation angle or a capillary phenomenon occurs. The foam lubricant of the present invention is described in detail later.

The lubricant 10 for initial lubrication accommodated in the track portion in the vicinity of the torque transmission member 5, the portion of the cage window 6a in the vicinity of the torque transmission member 5 or the bottom portion 2a of the outer member is not contained in the resin unlike the lubricating component contained in the foam lubricant. Therefore the lubricant 10 for initial lubrication is capable of easily moving inside the constant velocity universal joint, thus being capable of reaching the sliding portions inside the constant velocity universal joint when the constant velocity universal joint starts to operate. Grease or lubricating oil, having predetermined properties, which is described later is used as the lubricant 10 for initial lubrication. Thus the lubricant 10 for initial lubrication is capable of easily moving to the sliding portions. When the lubricating oil is used as the lubricant 10 for initial lubrication, the lubricating oil has a viscosity not less than a predetermined kinematic viscosity, as described later. Therefore the lubricating oil is capable of remaining at the sliding portions.

Consequently, the lubricant 10 for initial lubrication is capable of compensating lubrication which is liable to be short in an initial period of time of the lubrication (initial period of time in rotation).

Figure 4:
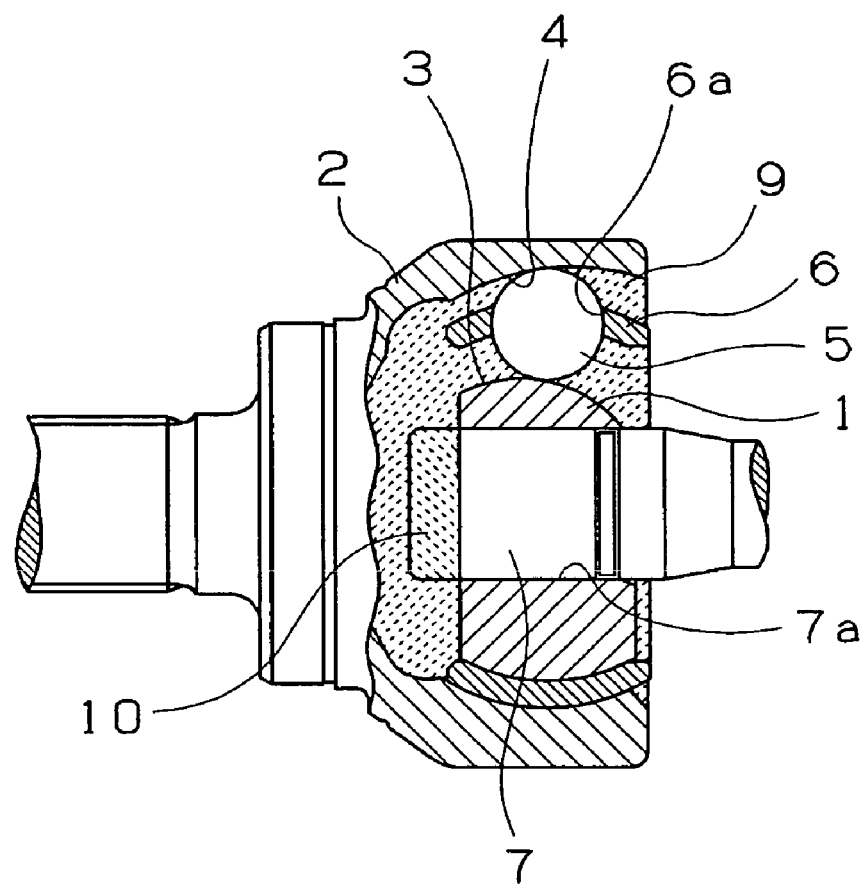
FIG. 4 is a sectional view showing another constant velocity universal joint utilizing the lubricating system of the present invention.

The process for producing the universal joint of the present invention is concretely described below with reference to FIGS. 4 through 8. FIG. 4 shows another embodiment of the present invention where the present invention is applied to the ball-fixed type constant velocity universal joint which is one of the fixed-type constant velocity universal joint. FIGS. 5 through 8 are sectional views of the constant velocity universal joint shown in FIG. 4 for showing one example of the production process of the present invention.

As shown in FIG. 4, the constant velocity universal joint is constructed of the inner member (inner ring) 1, the outer member (outer ring) 2, the torque transmission members (steel balls) 5, the cage 6, the foam lubricant 9, the lubricant 10 for initial lubrication, and accessories.

A plurality of the track grooves 4 are formed on the spherical inner peripheral surface of the outer member 2. A plurality of the outer member-side track grooves 3 making a pair with the outer member-side track grooves 4 are formed on the spherical peripheral surface of the inner member 1. A plurality of the torque transmission members 5 are interposed between the outer member-side track groove 4 and the inner member-side track groove 3. The torque transmission member 5 is held by the cage window 6a of the cage 6 disposed between the outer member 2 and the inner member 1. The inner member 1 has the shaft hole 7a into which the shaft 7 constructing the shaft member is inserted from the open side of the outer member 2.

An example of the process for producing the constant velocity universal joint shown in FIG. 4 is described in detail below.

Figure 5:
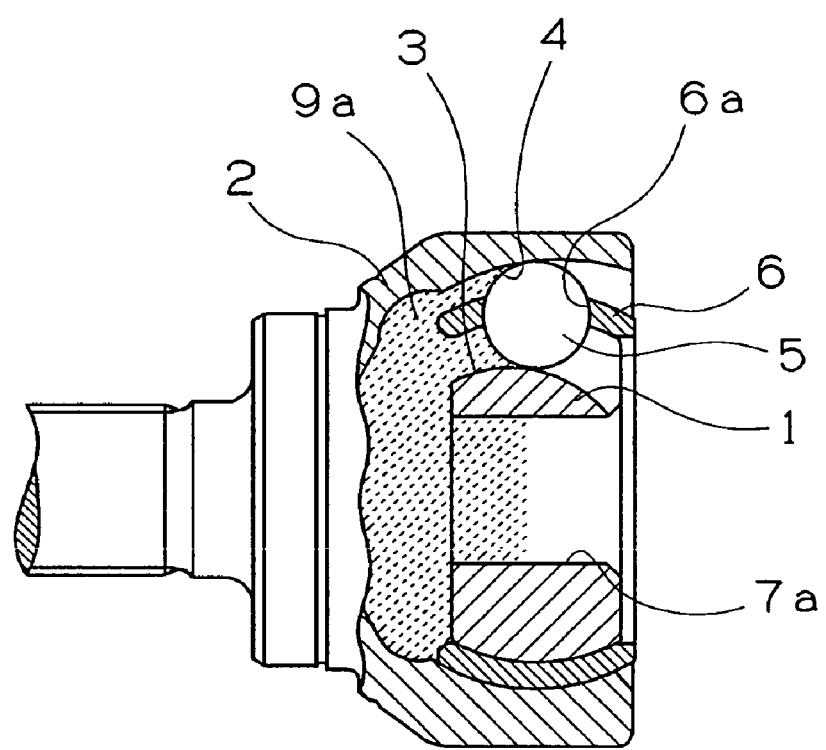
FIG. 5 is a sectional view of a constant velocity universal joint for showing an example of the production process of the present invention.

Initially as shown in FIG. 5, the cage 6, the torque transmission members (steel balls) 5, the inner member 1 all composing the inner parts are sequentially incorporated inside the outer member 2 to obtain a sub-assembled state. A mixture 9a of resin which foams, hardens, and becomes porous, a lubricating component, a hardener, and a foaming agent is injected into and filled in a gap between the outer member 2 and the inner member 1 from an innermost portion (front end of stopper) of the shaft hole 7a of the inner member 1. FIG. 5 shows a state in which the mixture 9a is being injected.

Figure 6:
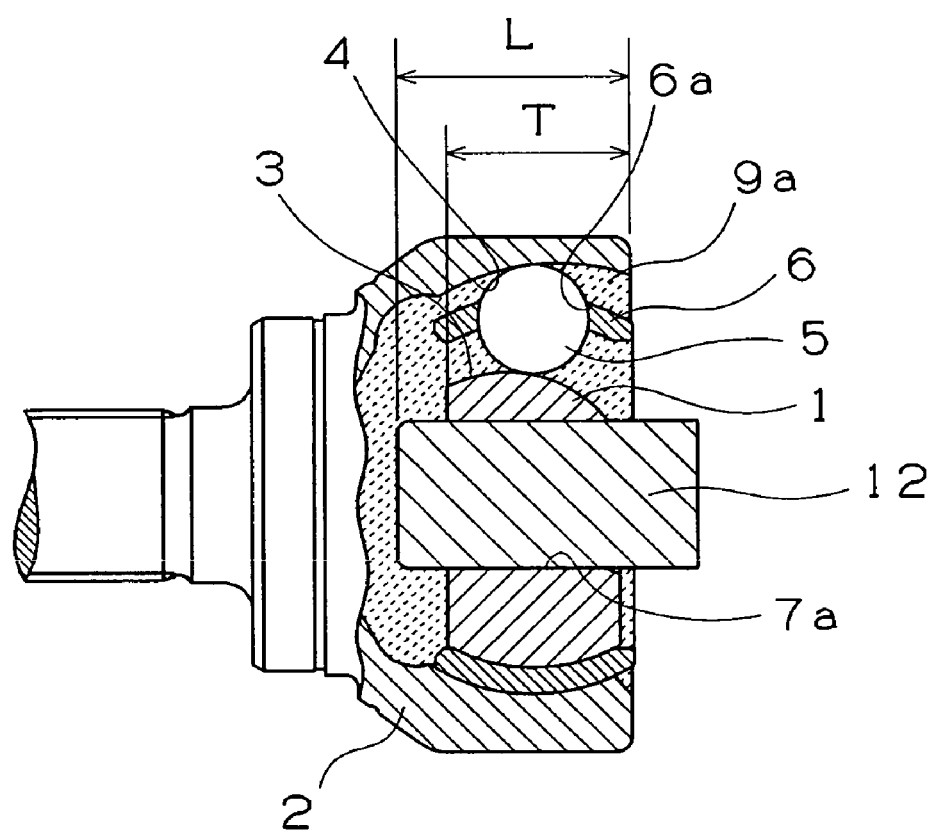
FIG. 6 is a sectional view of a constant velocity universal joint for showing an example of the production process of the present invention.

Immediately after the mixture 9a is filled in the gap, as shown in FIG. 6, a stopper 12 shaft-shaped and having an axial length longer than the axial length of the shaft hole 7a is inserted into the shaft hole 7a of the inner member from a shaft member insertion side to seal the shaft hole 7a. The stopper 12 is projected from a side of the shaft hole 7a opposite to the shaft member insertion side thereof and the shaft member insertion side of the outer member 2 to set an axial length (L in FIG. 6) of a portion of the stopper 12 inserted into the outer member 2 longer than an axial length (T in FIG. 6) thereof from an open-side end of the outer member 2, namely, from an end of the shaft member insertion side to an end of the inner member 1 at the side opposite to the shaft member insertion side thereof. In this state, the mixture 9a is foamed and hardened.

In this case, the stopper 12 is projected not only from the side of the shaft hole 7a opposite to the shaft member insertion side thereof but also from the shaft member insertion side of the outer member 2, therefore the stopper 12 can be easily inserted into the shaft hole 7a and removed therefrom.

The diameter of the stopper 12 is set equally to that of the shaft 7 (see FIG. 1). It is preferable that the front portion of the stopper 12 is rod-shaped similarly to the front portion of the shaft 7. As shown in FIG. 6, instead of the shaft 7, the stopper 12 liquid-tightly seals the portion of the inner member into which the shaft 7 is inserted. It is unnecessary to limit the material for the stopper 12 to a specific one, but it is preferable to use a material having a favorable mold release characteristic so that the foam lubricant little sticks thereto and thereby the workability can be enhanced. As materials having a favorable mold release characteristic, polyethylene resin, polyoxymethylene resin, polytetrafluoroethylene (PTFE) resin, other fluorocarbon resins or silicone resin are listed. "To use a material having a favorable mold release characteristic" means the application of a material that facilitates the work of taking out the stopper 12 from the shaft hole 7a to the stopper 12.

The base material of the stopper 12 is made of a resin or a metal. The surface of the stopper 12 may be made of the fluorine-based or silicone-based resin or rubber or made of a mold release film formed by applying a fluorine-based or silicone-based liquid or a sprayed mold release agent dissolved or dispersed in a volatile solvent to the surface of the resin or the metal and drying them. In addition, mold release films having known forms may be formed on the surface of the stopper 12 by using known methods such as plating.

As examples of the mold release film, films plated with chromium, nickel, silver, or the like; and films made of a solid lubricant consisting of molybdenum disulfide, graphite, or the like are listed.

Because the above-described mixture is foamed and hardened with the stopper 12 mounted on the inner member, the pressure of the fluid is increased. Therefore the fluid favorably flows into the portion where the cage window and the tracks are formed. Thereby the space between the inner member 1 and the outer member 2 is filled with the fluid. As a result, the filled mixture foams and hardens, and the foam lubricant 9 can be efficiently filled in the vicinity of the sliding portions of the constant velocity universal joint. Thereby it is possible to improve the lubrication inside the constant velocity universal joint and prolong the life thereof.

When the mixture is foamed in a state where the stopper 12 is not mounted on the inner member, an insufficient amount of the mixture flows into the portion where the cage window and the tracks are formed or the mixture may flow into the shaft hole 7a. Consequently at a subsequent step, there is a case in which the shaft 7 cannot be mounted in the shaft hole 7a.

The stopper 12 is removed from the shaft hole 7a at a proper stage at which the foaming and hardening of the mixture finishes. In disposing the lubricant 10 for initial lubrication in the vicinity of the sliding portion or the rolling portion inside the universal joint, it is possible to inject the lubricant 10 for initial lubrication to the above-described predetermined portions by an injector or the like. Thereafter instead of the stopper 12, the shaft 7 is inserted into the predetermined portion and mounted thereon.

Thereafter the bellows-like rubber boot 8 is mounted on the entirety of the inner member 1, the torque transmission members (steel balls) 5, and the cage 6 with the boot 8 striding over the periphery of the outer member 2 and the periphery of the shaft 7 held by the inner member 1. Thereafter the boot 8 is fastened with a band-shaped fastening tool (so-called boot band not shown) and sealed. In this manner, the constant velocity universal joint in which the lubricant for initial lubrication and the foam lubricant are present together is obtained (see FIG. 1).

Figure 7:
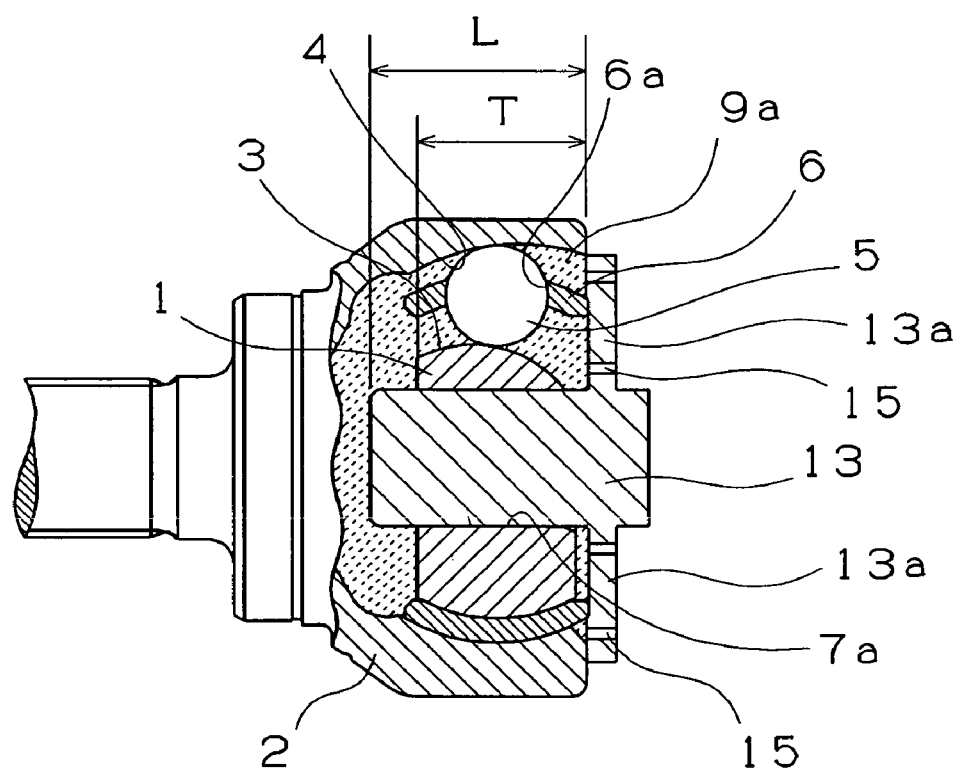
FIG. 7 is a sectional view of a constant velocity universal joint for showing an example of the production process of the present invention.

The configuration of the stopper to be inserted into the shaft hole 7a of the inner member 1 is not limited to the one shown in FIG. 6, but as with a stopper 13 shown in FIG. 7, it is possible to use a stopper having a flange 13a closing the shaft member insertion-side open portion of the outer member 2 circumferentially on the periphery of the shaft-shaped stopper. In this case, because in foaming the lubricating component contained in the mixture 9a, the mixture 9a is intercepted by the flange 13a, the mixture 9a does not leak from the shaft member insertion-side open portion of the outer member 2. Thus it is possible to improve the filling ratio of the foam lubricant 9 into the constant velocity universal joint.

An air hole 15 for releasing air inside the constant velocity universal joint to the outside may be formed through the flange 13a of the stopper 13. Thereby in foaming the mixture 9a composing the foam lubricant 9, the air which will escape from the inside of the constant velocity universal joint can be released to the outside owing to the expansion of the mixture 9a. Therefore it is possible to suppress the rise of the internal pressure of the constant velocity universal joint and thereby prevent the stopper 13 from being pressed and dropped out of the shaft hole 7a toward the shaft member insertion-side. Other constructions of the stopper 13 are similar to those of the stopper 12 shown in FIG. 6. The method of inserting the stopper 13 into the shaft hole 7a is also similar to that of inserting the stopper 12 thereinto. Thus detailed description thereof is omitted herein.

Figure 8:
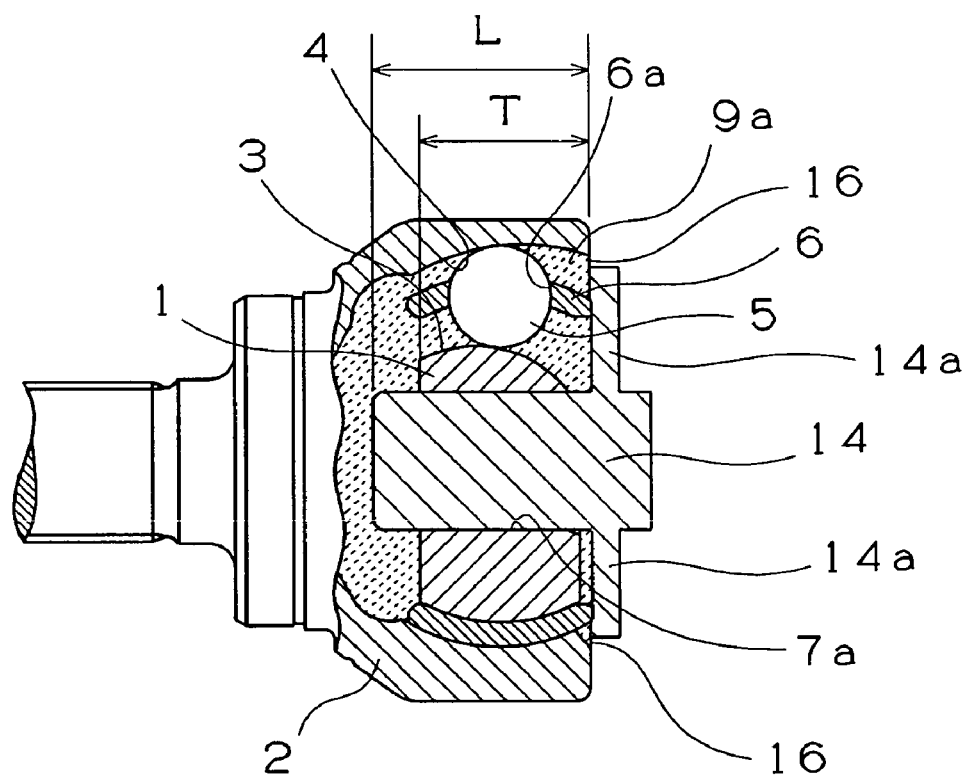
FIG. 8 is a sectional view of a constant velocity universal joint for showing an example of the production process of the present invention.

As another stopper, it is possible to use a stopper 14 shown in FIG. 8. Similarly to the shaft-shaped stopper 13 shown in FIG. 7, also in the stopper 14, the periphery of the shaft-shaped stopper shown in FIG. 6 is provided with a flange 14a for intercepting the mixture 9a composing the foam lubricant 9 to be injected into the outer member 2 from leaking from the shaft member insertion-side open portion of the outer member 2.

But unlike the stopper 13, shown in FIG. 7, which has the air hole, an air hole is not formed through the flange 14a of the stopper 14, but the radial length of the flange 14a is so set that the radial length of the flange 14a is slightly smaller than the inner diameter of shaft member insertion-side open portion of the outer member 2.

In this case, when the stopper 14 is inserted into the shaft hole 7a, a slight gap 16 is generated between the inner peripheral surface of the shaft member insertion-side open portion of the outer member 2 and the peripheral surface of the portion of the stopper 14 where the flange 14a is formed. The slight gap performs an air permeability, thus releasing air inside the constant velocity universal joint to the outside thereof owing to the expansion of the mixture 9a when the mixture 9a foams. Therefore it is possible to suppress the rise of the internal pressure of the constant velocity universal joint and thereby prevent the stopper 14 from being pressed toward the shaft member insertion-side and slipping out of the shaft hole 7a. Structures of other portions of the stopper 14 are similar to those of the stopper 12 shown in FIG. 6. The method of inserting the stopper 14 into the shaft hole 7a is also similar to that of inserting the stopper 12 thereinto. Thus detailed description thereof is omitted herein.

After the mixture 9a composing the foam lubricant 9 foams and hardens, the stopper 12 shown in FIG. 6 is removed. Thereby at the side of the shaft hole 7a of the inner member 1 opposite to the shaft member insertion side thereof, a space is formed by the end surface of shaft hole 7a at the side opposite to the shaft member insertion side thereof and the foam lubricant 9. As shown in FIG. 4, the lubricant 10 for initial lubrication is injected into the space. Thereafter the shaft 7 is inserted into the shaft hole 7a.

An example in which the lubricant 10 for initial lubrication is disposed at a portion other than the space formed by removing the stopper is shown below.

Figure 9:
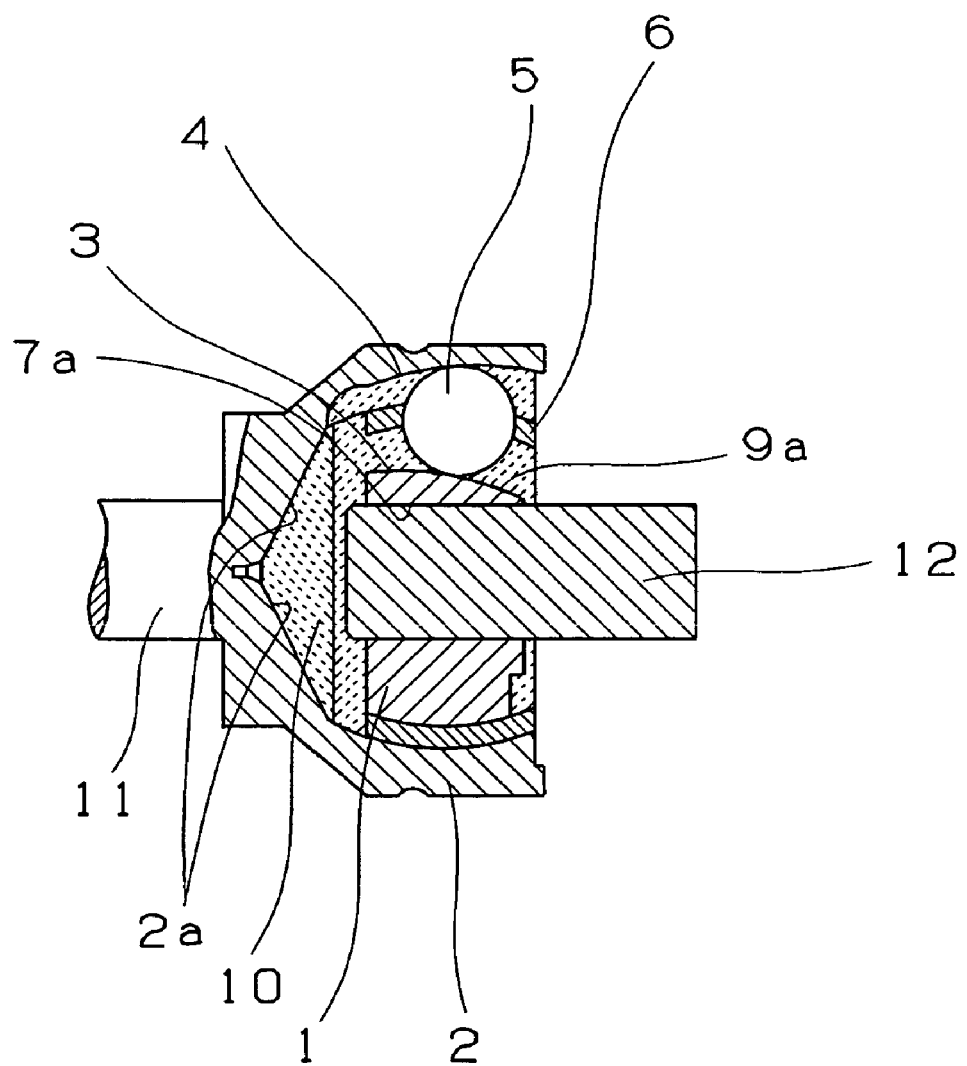
FIG. 9 is a sectional view of a constant velocity universal joint for showing an example of the production process of the present invention.

As shown in FIG. 9 which is a sectional view of the constant velocity universal joint for showing an example of the producing process of the present invention, the cage 6, the torque transmission members (steel balls) 5, the inner member 1 all constructing the inner parts of the constant velocity universal joint are sequentially incorporated inside the outer member 2 to obtain a sub-assembled state. After the lubricant 10 for initial lubrication is enclosed at the bottom portion 2a of the outer member 2, the mixture 9a composed essentially of the lubricating component mixed with the resin which foams, hardens, and becomes porous is filled in the predetermined portion by using a process similar to that of producing the constant velocity universal joint shown in FIGS. 5 through 8. Thereafter the mixture is foamed and hardened to obtain the foam lubricant. In this manner, it is possible to obtain the sub-assembled state in which the lubricant for initial lubrication and the foam lubricant are present together.

By enclosing the lubricant 10 for initial lubrication in the bottom portion 2a of the outer member 2, the lubricant 10 for initial lubrication will move from the bottom portion 2a of the outer member toward the boot 8 owing to a centrifugal force and a bending motion caused by rotation. Thus the lubricant 10 for initial lubrication promptly rapidly moves to the torque transmission member and the spherical surface portion.

As methods for enclosing the lubricant 10 for initial lubrication in the universal joint, the lubricant for initial lubrication may be enclosed in or applied to the inside of the universal joint and component parts thereof before the foam lubricant is filled in the universal joint, as the above-described method of enclosing the lubricant 10 for initial lubrication in the bottom portion 2a of the outer member. Alternatively, after the foam lubricant is filled in the universal joint, the lubricant 10 for initial lubrication may be injected into a desired portion by an injector (or appliances similar thereto). As shown in FIG. 2 or FIG. 3, as portions to which the lubricant 10 for initial lubrication is injected, the lubricant 10 for initial lubrication may be injected into the portion of the cage window 6a in the vicinity of the torque transmission member 5 and to the track portion in the vicinity of the torque transmission member 5. To enclose the lubricant 10 for initial lubrication in the universal joint, it is possible to use a grease gun, a mixing head, an injector or the like. When the lubricant 10 for initial lubrication consists of lubricating oil, it may be poured into the universal joint by using a container. When the lubricant 10 for initial lubrication consists of grease, it may be applied thereto.

The place inside the universal joint where the lubricant 10 for initial lubrication is enclosed is not limited to a specific place, provided that when the constant velocity universal joint starts to operate, the lubricant 10 for initial lubrication reaches the sliding portion inside the universal joint. It is preferable to enclose the lubricant 10 for initial lubrication in the vicinity of the rolling portion and the sliding portion inside the constant velocity universal joint. As concrete portions where the lubricant 10 for initial lubrication is enclosed, it is possible to list the bottom portion of the outer member, the track portion in the vicinity of the torque transmission member, the inside-diameter and outside-diameter surfaces of the cage, the inside of the cage window, the spherical surfaces of the outer member-cage-inner member, and the space formed by removing the stopper.

The amount of the lubricant 10 for initial lubrication to be enclosed inside the universal joint is favorably 1 to 60 vol % and more favorably 3 to 40 vol % of the volume of the space inside the universal joint. In disposing the lubricant 10 for initial lubrication in the space inside the outer member 2 formed by the end surface of the shaft hole 7a at the side thereof opposite to the shaft member insertion side and the foam lubricant 9, the amount thereof is favorably 80 to 200 vol % and more favorably 90 to 150 vol % of the volume of the space inside the outer member 2 formed by the end surface of the shaft hole 7a at the side thereof opposite to the shaft member insertion side and the foam lubricant 9. If the amount of the lubricant 10 for initial lubrication is less than the above-described range, the amount thereof is insufficient for the amount to be utilized for lubrication. If the amount thereof is more than the above-described range, it is difficult to inject the lubricant 10 for initial lubrication to the predetermined portion. In case when the lubricant 10 for initial lubrication is enclosed before the foam lubricant is filled in the joint, if the amount of the lubricant 10 for initial lubrication is so small as above, the amount thereof is insufficient for the amount to be utilized for lubrication. If the amount of the lubricant 10 for initial lubrication is so large as above, the enclosing amount of the foam lubricant contributing to a long-term lubrication is small, which poses a problem in the durability of the universal joint.

As described above, the foam lubricant may be foamed and hardened after the mixture containing the lubricating component and the resin is poured into the inside of the universal joint which is the portion to be lubricated. Alternatively after the mixture is foamed and hardened at a normal pressure, the mixture is later-processed into a desired configuration by means of cutting or grinding, and thereafter the foam lubricant may be incorporated in the universal joint.

The foam lubricant can be easily filled in a desired portion inside the universal joint having a complicated configuration. The foam lubricant eliminates the need for the preparation of a molding die for obtaining a foamed molding and performing a grinding process. Therefore it is preferable to adopt a method of pouring the mixture into the universal joint before foaming and hardening the mixture and foaming and hardening the mixture inside the universal joint.

By adopting the above-described method, it is unnecessary to use a die for molding the foam lubricant and enclose the foam lubricant in the universal joint after it is assembled from parts. Thus the above-described method is excellent in an assembling operation. Consequently the production efficiency is improved and thus the universal joint can be produced at a low cost.

The above-described mixture-filling method is not limited to a specific method. It is preferable to use a known quantitative mixing dispenser (called a mixing dispenser) having a cylinder and a piston not shown in the drawings because the use thereof allows the filling amount of the mixture to be easily adjusted and a favorable workability to be obtained. In addition, after the mixture is filled in the universal joint, it is preferable to insert the stopper 12 composed of synthetic resin, a rubber material or the like into the shaft hole 7a so that the state of sealing is liquid-tight.

The components of the mixture and the method for mixing the components with one another are described later.

As examples in which the universal joint of the present invention is utilized as the constant velocity universal joint, in addition to the above-described ball-fixed type joint, an undercut free joint (herein after referred to as UJ) and the like are exemplified. The number of the torque transmission members (balls) of the BJ and UJ is six or eight in some case.

When the lubricant for initial lubrication and the foam lubricant are present together in the BJ or the UJ, the foam lubricant is filled in only portions required to be lubricated, and in initial lubrication, the lubricant for initial lubrication is present at the sliding portion. Therefore the co-presence of the lubricant for initial lubrication and the foam lubricant is capable of contributing the production of a low cost, lightweight, and long-life universal joint. Further because an operational angle is large, the foam lubricant is apt to be subjected to compression and flexure. Thereby the lubricating component is apt to be supplied from the foam lubricant to the sliding portion.

As examples in which the universal joint of the present invention is utilized for the sliding-type constant velocity universal joint, a double offset joint, the tripod joint, and a cross-groove joint are listed.

As a nonconstant velocity universal joint, a cross joint is exemplified.

Figure 10:
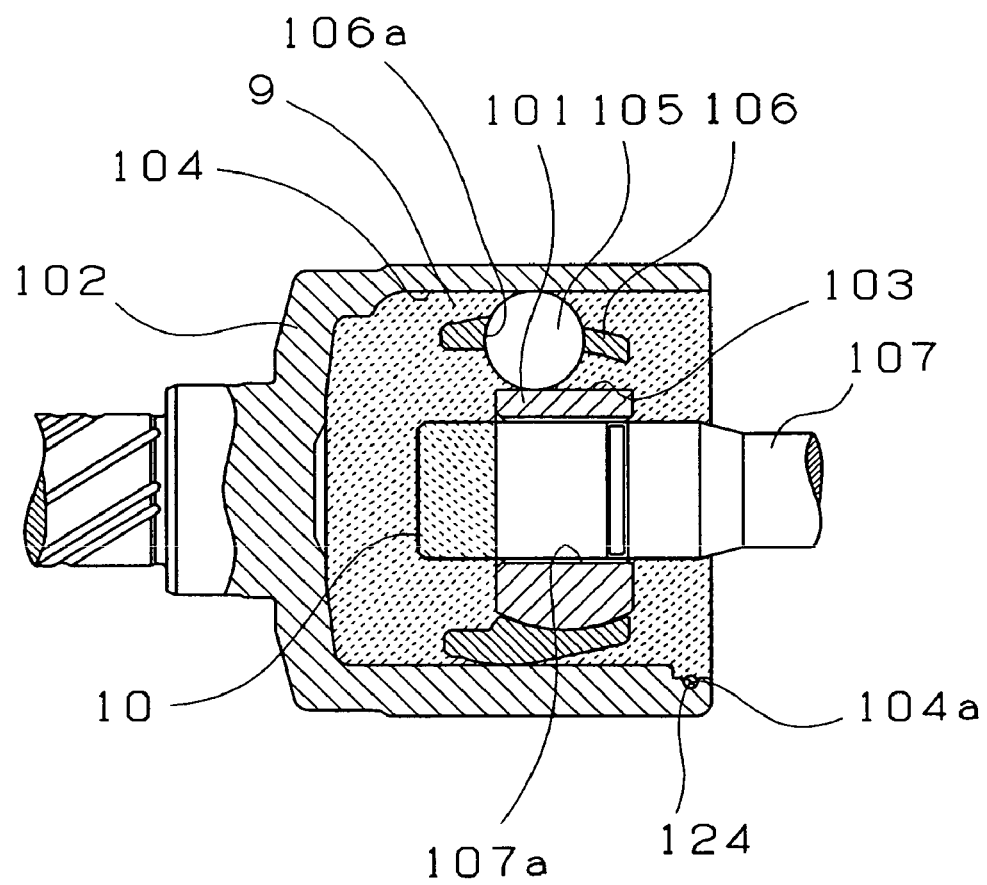
FIG. 10 is a sectional view showing another constant velocity universal joint utilizing the lubricating system of the present invention.
Figure 11:
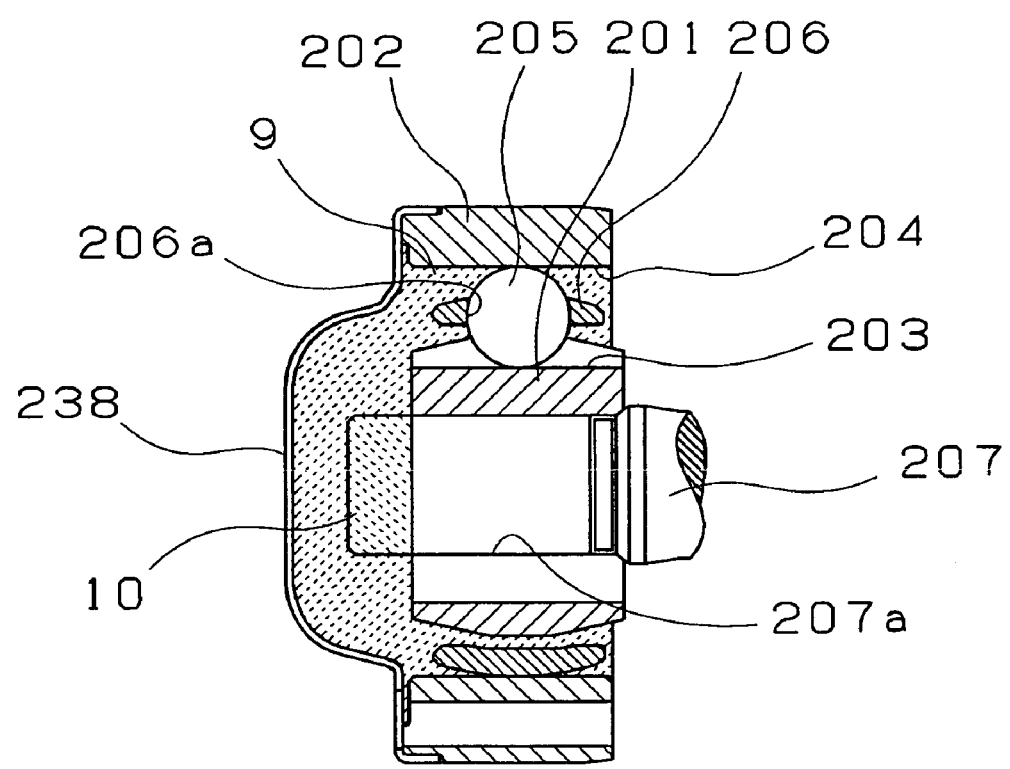
FIG. 11 is a sectional view showing another constant velocity universal joint utilizing the lubricating system of the present invention.
Figure 12:
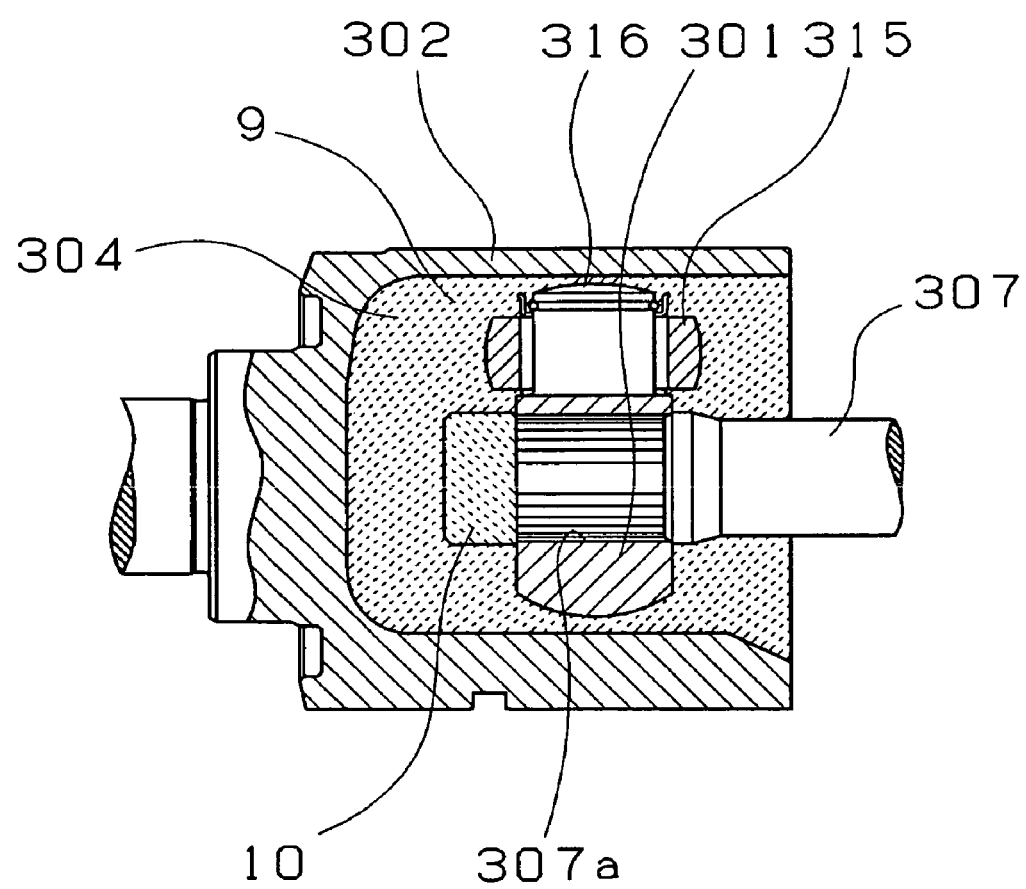
FIG. 12 is a sectional view showing another constant velocity universal joint utilizing the lubricating system of the present invention.

FIGS. 10 through 12 are sectional views showing another constant velocity universal joint utilizing the lubricating system of the present invention. A case in which the universal joint of the present invention is applied to a representative constant velocity universal joint is described below.

FIG. 10 shows another embodiment of the present invention. In this embodiment, the present invention is applied to a double offset-type constant velocity universal joint (DOJ) which is one of the sliding-type constant velocity universal joint.

As shown in FIG. 10, the constant velocity universal joint is constructed of an inner member (inner ring) 101, an outer member (outer ring) 102, torque transmission members (steel balls) 105, a cage 106, a snap ring 124, and accessories. The inner member 101, the torque transmission member 105, the cage 106, and the snap ring 124 are disposed at an inner side of the outer member 102, thus constructing inner parts.

A plurality of axially extended linear track grooves 104 are formed on a cylindrical inner peripheral surface of the outer member 102. A fit-in groove 104a is formed at an open side of the track groove 104. The snap ring 124 is fitted in the fit-in groove 104a. The snap ring 124 prevents the cage 106, the torque transmission member 105, and the inner member 101 constructing a part of the inner parts from being removed from the outer member 102.

A plurality of the track grooves 103 making a pair with the outer member-side track grooves 104 are formed on the spherical peripheral surface of the inner member 101. A plurality of the torque transmission members 105 are interposed between the outer member-side track grooves 104 and the inner member-side track grooves 103. The torque transmission members 105 are held by the cage window 106a of the cage 106. The inner member 101 has a shaft hole 107a into which a shaft 107 constructing a shaft member is inserted from the open side of the outer member 102.

In this embodiment, similarly to the embodiments of the above-described other universal joints, the foam lubricant 9 is disposed inside the constant velocity universal joint.

At a step of disposing the foam lubricant 9 inside the constant velocity universal joint, in injecting a mixture essentially containing the resin which foams, hardens, and becomes porous and the lubricating component both composing the base components of the foam lubricant 9 into the constant velocity universal joint, of the inner parts, the cage 106, the torque transmission member 5, and the inner member 101 are sequentially incorporated inside the outer member. After the snap ring 124 is fitted in the fit-in groove 104a of the outer member 102, the mixture 9a is injected from the shaft hole 107a of the inner member 101. The process of disposing the foam lubricant 9 inside the constant velocity universal joint and the components of the foam lubricant 9 are the same as those of the above-described other embodiments. Thus detailed description thereof is omitted herein.

The operation and effect of the method of disposing the foam lubricant 9 of the above-described embodiment inside the constant velocity universal joint are the same as those of the above-described other embodiments. Thus detailed description thereof is omitted herein.

By using the method of disposing the foam lubricant 9 in the constant velocity universal joint, at the shaft member insertion side of the inner member 101, the lubricant 10 for initial lubrication is injected into the space formed by the foam lubricant 9 and the end surface (not shown) of the cage 106 at the side thereof opposite to the shaft member insertion side. The operation and effect of the method of disposing the foam lubricant 9 inside the constant velocity universal joint are the same as those of the above-described other embodiments. Thus detailed description thereof is omitted herein.

FIG. 11 shows another embodiment of the present invention. In this embodiment, the present invention is applied to the cross-groove type constant velocity universal joint (LJ) which is one of the sliding-type constant velocity universal joint.

As shown in FIG. 11, the constant velocity universal joint is constructed of an inner member (inner ring) 201, an outer member (outer ring) 202, torque transmission members (steel balls) 205, a cage 206, and accessories. The inner member 201, the torque transmission member 205, and the cage 206 are disposed inside the outer member 202, thus constructing inner parts.

The outer member 202 has an open portion at both ends thereof. A linear track groove 204 is formed on an inner peripheral surface thereof. A track groove 203 inclined in a direction opposite to an outer member-side track groove 204 with respect to the axial direction is formed on a peripheral surface of the inner member 201. The torque transmission members 205 are disposed at a cross portion between the outer member-side track groove 204 and the inner member-side track groove 203. The torque transmission members 205 are retained by a cage window 206a of the cage 206 positioned between the outer member 202 and the inner member 201. The inner member 201 has a shaft hole 207a into which a stub shaft 207 constructing the shaft member is inserted.

An end plate 238 for preventing the leak of the lubricating component such as grease filled inside the constant velocity universal joint to the outside and preventing the penetration of a foreign matter thereinto from the outside is fixed to the outer member 202 at the side thereof opposite to the shaft member insertion side by bolting (not shown) the end plate 238 from the insertion side of the stub shaft 207.

In this embodiment, the foam lubricant 9 is disposed inside the outer member 202 and the end plate 238. At the step of disposing the foam lubricant 9 inside the constant velocity universal joint, the method of injecting the mixture containing essentially the resin, constituting the base component of the foam lubricant 9, which foams, hardens, and becomes porous and the lubricating component (also constituting the base component of the foam lubricant 9) mixed with the resin into the constant velocity universal joint is similar to that of the above-described embodiment except that before the mixture 9a is injected into the shaft hole 207a, the end plate 238 is mounted on the outer member 202 at the end of the side thereof opposite to the shaft member insertion side. Because the components of the foam lubricant 9 are similar to those of the above-described other embodiments, detailed description thereof is omitted herein.

The operation and effect of the method of disposing the foam lubricant 9 inside the constant velocity universal joint are the same as those of the above-described other embodiments. Thus detailed description thereof is omitted herein.

By using the method of disposing the foam lubricant 9 inside the constant velocity universal joint and inside the end plate 238, at side of the inner member 201 opposite to the shaft member insertion side thereof, the lubricant 10 for initial lubrication is injected into the space formed by the end surface of shaft hole 207a of the inner member 201 at the side thereof opposite to the shaft member insertion side thereof and the foam lubricant 9. The operation and effect of the lubricant 10 for initial lubrication are the same as those of the above-described other embodiments. Thus detailed description thereof is omitted herein.

FIG. 12 shows another embodiment of the present invention. In this embodiment, the present invention is applied to the tripod-type constant velocity universal joint (TJ) which is one of the sliding-type constant velocity universal joint.

As shown in FIG. 12, the constant velocity universal joint is constructed of a tripod member 301 constructing an inner member, an outer member (outer ring) 302, a roller 315, a journal 316, and accessories. The tripod member 301, the roller 315, and the leg shaft 316 are disposed at the inner side of the outer member 302, thus constructing inner parts.

Three axially extended linear track grooves 304 are formed on an inner peripheral surface of the outer member 302. The tripod member 301 has three journals 316 radially projected. The roller 315 is rotatably supported by the leg shafts 316. The roller 315 is rotatably inserted into the outer member-side track grooves 304 and guided along the track grooves 304. The tripod member 301 has a shaft hole 307a into which a shaft 307 is inserted.

In this embodiment, the foam lubricant 9 is disposed inside the constant velocity universal joint. Because the method of disposing the foam lubricant 9 inside the constant velocity universal joint and the components thereof are the same as those of above-described other embodiments, detailed description thereof is omitted.

The operation and effect of the method of disposing the foam lubricant 9 inside the constant velocity universal joint are the same as those of the above-described other embodiments. Thus detailed description thereof is omitted herein.

By using the method of disposing the foam lubricant 9 in the constant velocity universal joint, at the side of the tripod member 301 opposite to the shaft member insertion side thereof, the lubricant 10 for initial lubrication is injected into the space formed by the foam lubricant 9 and the end surface of the shaft hole 307a of the tripod member 301 constructing an inner member at the side thereof opposite to the shaft member insertion side thereof. The operation and effect of the lubricant 10 for initial lubrication are the same as those of the above-described other embodiments. Thus detailed description thereof is omitted herein.

In the embodiments shown in FIGS. 10 through 12, the configuration of the stopper to be inserted into the shaft hole is not limited to that shown in FIG. 6, but as with the stopper shown in FIG. 7, it is possible to use a shaft-shaped stopper having a flange closing the shaft member insertion-side open portion of the outer member on the peripheral surface thereof and an air hole formed through the flange.

As shown in FIG. 8, it is also possible to use a stopper so designed that a flange is formed on the peripheral surface of the shaft-shaped stopper as with the stopper shown in FIG. 7 and that the outer diameter of a portion of the stopper where the flange is formed is a little smaller than the inner diameter of the shaft member insertion-side open portion of the outer member.

Figure 17:
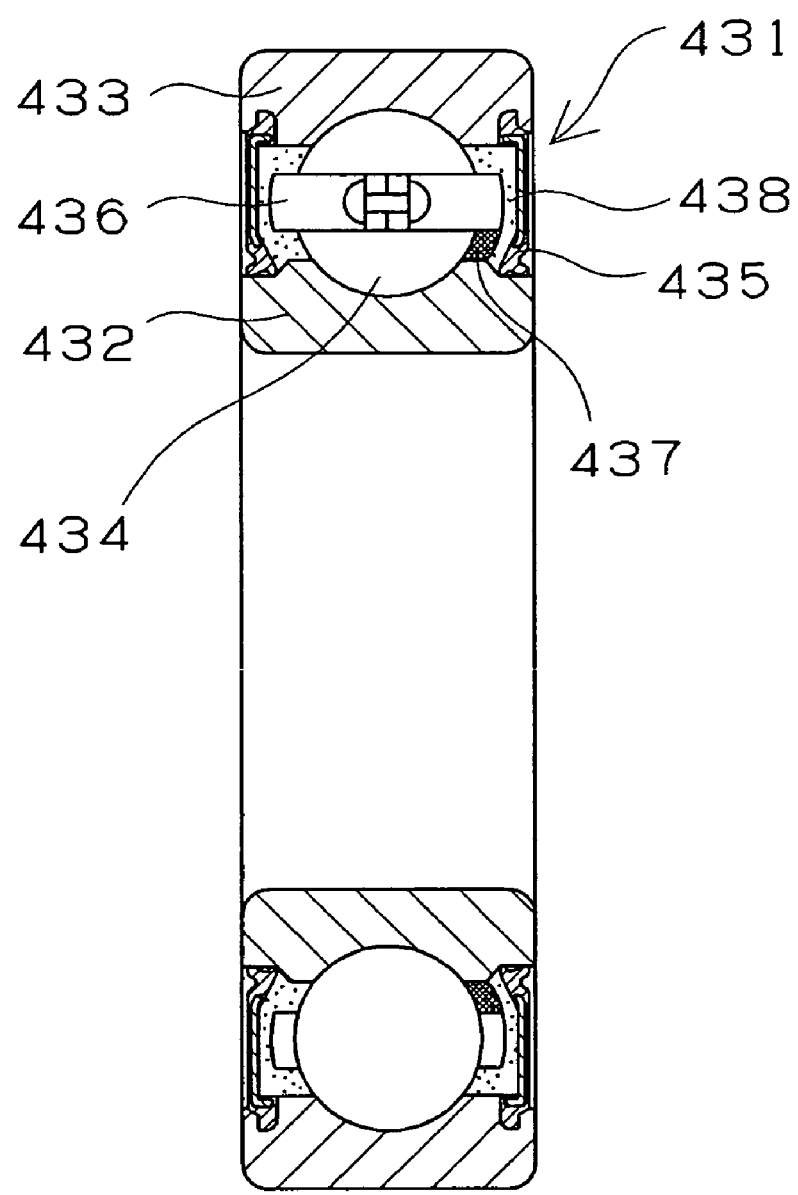
FIG. 17 is a sectional view of a deep groove ball bearing of an embodiment of the present invention.

An example in which the lubricating system of the present invention is applied to the bearing is concretely described below with reference to drawings. FIG. 17 is a sectional view of a deep groove ball bearing of an embodiment of the present invention.

As shown in FIG. 17, a bearing 431 is constructed of an inner ring 432, an outer ring 433 disposed concentrically with the inner ring 432, a plurality of rolling elements 434 disposed between the inner ring 432 and the outer ring 433, a cage 436 holding a plurality of the rolling elements 434, and a sealing member 435 fixed to the outer ring 433 and the like.

A foam lubricant 438 and a lubricant for initial lubrication 437 are present together in the inside of the bearing, which is a portion to be lubricated, by disposing the foam lubricant 438 in a space surrounded with the inner ring 432, the outer ring 433, a plurality of the rolling elements 434, and the sealing member 435 and disposing the lubricant for initial lubrication 437 consisting of the grease or the lubricating oil in the vicinity of the rolling elements 434 constructing the rolling portion. The method of enclosing the foam lubricant 438 and the lubricant for initial lubrication 437 in the universal joint is described later.

In the bearing of the present invention, the lubricating component contained in the foam lubricant with the lubricating component impregnated thereinto is not exuded suddenly even though the foam deforms owing to an external force applied thereto, but can be efficiently exuded to the sliding portion and the like. Consequently a minimum amount of the lubricating component is necessary for the bearing. Thus the bearing has a long life and can be operated at a high speed.

The foam lubricant may be foamed and hardened after the above-described mixture is poured into the bearing. Alternatively after the mixture may be foamed and hardened at a normal pressure, the mixture may be later-processed into a desired configuration by means of cutting or grinding. Thereafter the foam lubricant can be incorporated in the bearing.

The foam lubricant can be easily filled at a desired portion inside the bearing having a complicated configuration. The foam lubricant eliminates the need for the preparation of a molding die for obtaining a foamed molding and performing a grinding process. Therefore it is preferable to adopt a method of pouring the mixture into the bearing before foaming and hardening the mixture and foaming and hardening the mixture inside the bearing. By adopting the above-described method, it is possible to make the producing step simple and the cost low.

Because the foam lubricant is soft, even in a full-pack specification, the rotational torque does not easily become large, and heat generation can be suppressed. Further the foam lubricant plays a sealing role for the penetration of dust and water into the bearing from the outside.

The bearing of the present invention can be used in the forms of various types of bearings. It is possible to exemplify a deep groove ball bearing, an angular ball bearing, a thrust ball bearing, a cylindrical roller bearing, a needle roller bearing, a thrust cylindrical roller bearing, a thrust needle roller bearing, a tapered roller bearing, a thrust tapered roller bearing, an self-aligning ball bearing, an self-aligning roller bearing, a thrust self-aligning roller bearing, and a sliding bearing and the like. It is possible for these bearings to have a sealing member or a sealing plate or not to have.

An example of the method of enclosing the foam lubricant inside the bearing is described below with reference to FIGS. 13 through 15.

Figure 13:
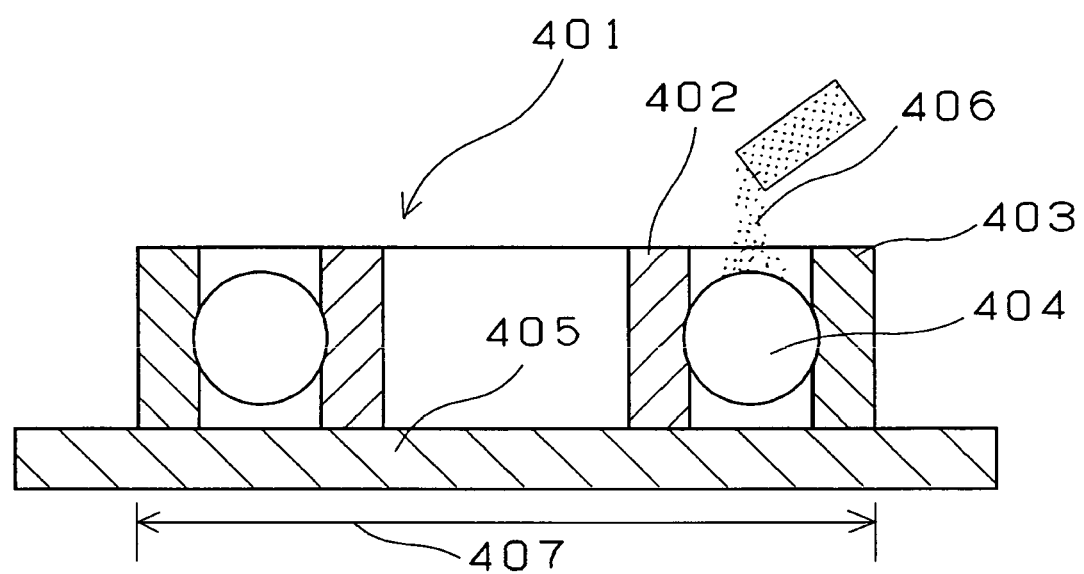
FIG. 13 is an illustration showing an example in which a foam lubricant is enclosed inside a radial ball bearing (not provided with sealing member) in another embodiment of the present invention.

FIG. 13 is an illustration showing an example in which a foam lubricant is enclosed inside a radial ball bearing (not provided with sealing member) in another embodiment of the present invention. As shown in FIG. 13, a bearing 401 having an inner ring 402, an outer ring 403, and rolling elements 404 interposed between the inner ring 402 and the outer ring 403 is placed on an iron plate 405 having a diameter larger than an outer diameter 407 of the bearing or placed on a jig similar thereto. A well-stirred mixture 406 of components of the foam lubricant immediately before it foams is poured into a space surrounded with the inner ring 402, the outer ring 403, and the iron plate 405 and foamed and hardened. In this case, after the mixture 406 is poured into the bearing 401, the iron plate 405 having the diameter larger than the outer diameter 407 of the bearing or a jig similar thereto may be placed on an upper part of the bearing 401. By placing the iron plate or the jig on the bearing 401, the filling ratio of the foam lubricant inside the bearing is enhanced. After the mixture 406 foams and hardens, the lubricant for initial lubrication is injected into a portion in the vicinity of the rolling elements 404, and the iron plate 405 or the jig similar thereto is removed from the bearing 401 to obtain the bearing in which the foam lubricant is enclosed.

Figure 14:
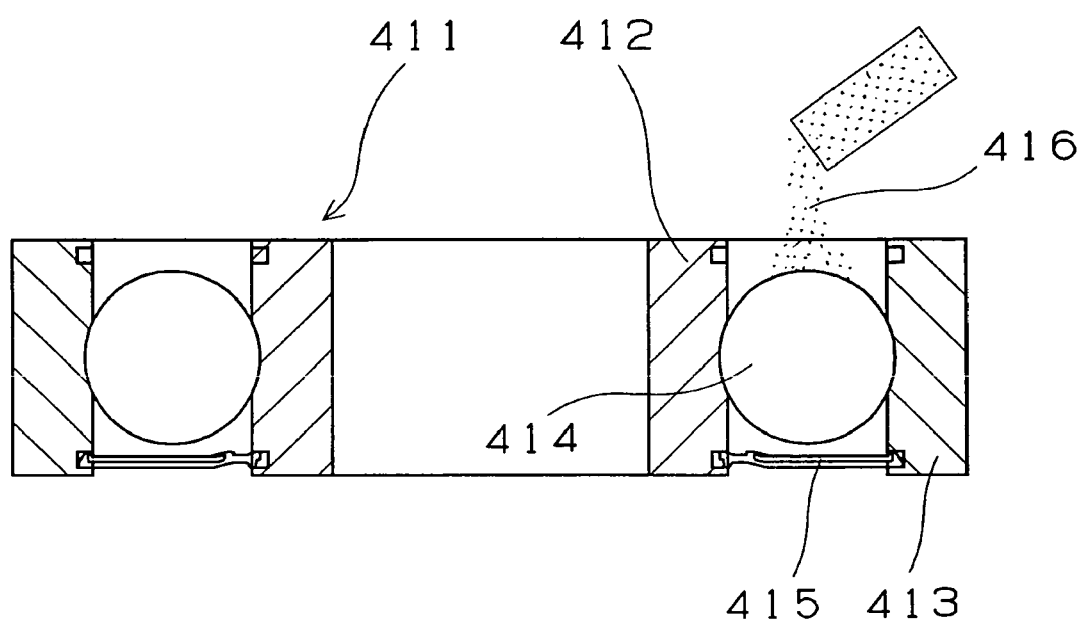
FIG. 14 is an illustration showing an example in which the foam lubricant is enclosed inside the radial ball bearing (provided with sealing member) in another embodiment of the present invention.

FIG. 14 is an illustration showing an example in which the foam lubricant is enclosed inside a radial ball bearing (provided with sealing member) in another embodiment of the present invention. As shown in FIG. 14, a bearing 411 having an inner ring 412, an outer ring 413, rolling elements 414 interposed between the inner ring and the outer ring, and a sealing member 415 mounted at only one side is stationarily placed with the sealing member 415 disposed at a lower side. A well-stirred mixture 416 of components of the foam lubricant immediately before it foams is poured into the bearing 411 and foamed and hardened. In this case, to enhance the filling ratio of the foam lubricant inside the bearing, as with the embodiment shown in FIG. 13, after the mixture 416 is poured into the bearing 411, an iron plate larger than the outer diameter of the bearing or a jig similar thereto may be placed on an upper part of the bearing 411. An upper-side sealing member may be mounted on the bearing 411 as a replacement of the jig used to enhance the filling ratio during a foaming step or after the mixture 416 foams and hardens. After the mixture 416 foams and hardens, the lubricant for initial lubrication is injected into a portion in the vicinity of the rolling elements 414 to obtain the bearing in which the foam lubricant is enclosed.

Figure 15:
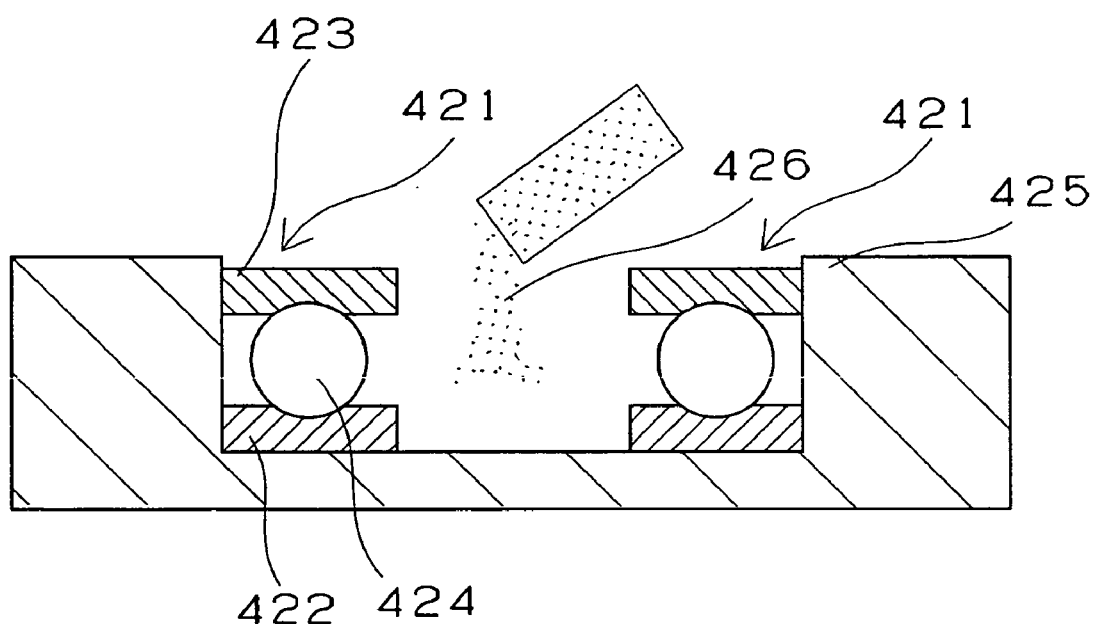
FIG. 15 is an illustration showing an example in which the foam lubricant is enclosed inside a thrust ball bearing (not provided with sealing member) in another embodiment of the present invention.
Figure 16:
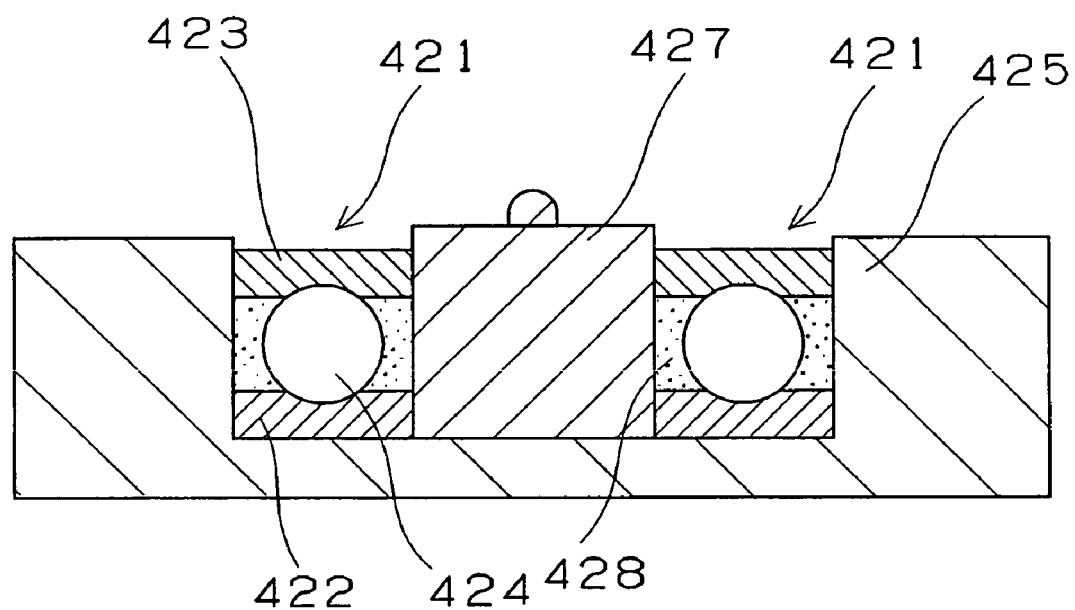
FIG. 16 is an illustration showing the use of a cylindrical jig in FIG. 15.

FIG. 15 is an illustration showing an example in which a foam lubricant is enclosed inside a thrust ball bearing in another embodiment of the present invention. FIG. 16 is an illustration showing the use of a cylindrical jig in FIG. 15. As shown in FIGS. 15 and 16, a die 425 capable of accommodating a thrust ball bearing 421 is prepared. A bearing 421 having an inner ring 422, an outer ring 423, rolling elements 424 interposed between the inner ring and the outer ring is set inside the die 425. A well stirred mixture 426 of components of the foam lubricant immediately before it foams is poured into the bearing 421 from an inside-diameter side of the bearing 421. Thereafter a cylindrical jig 427 whose diameter is equal to the inside diameter is inserted into an inside-diameter portion to foam and harden the mixture. After the mixture 426 foams and hardens to form a foam lubricant 428, the cylindrical jig 427 is removed from the inside-diameter portion, and the lubricant for initial lubrication is injected into a portion in the vicinity of the rolling elements 424. Thereafter the die 425 is removed from the bearing 421 to obtain the bearing in which the foam lubricant is enclosed.

It is possible to use an injection molder or the like to enclose the foam lubricant inside the bearing. In this case, with the bearing mounted on a die, a mixture consisting of components of the foam lubricant mixed in a screw is enclosed inside the bearing from a nozzle. To fill the mixture inside the bearing, it is possible to use a known quantitative mixing dispenser (called a mixing dispenser) having a cylinder and a piston. By using this method, it is possible to easily adjust the filling amount and improve the operability.

The method of enclosing the lubricant for initial lubrication inside the bearing is not specifically limited. Before filling the mixture consisting of the components of the foam lubricant inside the bearing, the lubricant for initial lubrication may be applied to the inside of the bearing and component parts thereof. Alternatively after the mixture consisting of the components of the foam lubricant foams and hardens, the lubricant for initial lubrication may be injected into a desired place of the bearing by an injector (or appliance similar thereto). The property and the like of the lubricant for initial lubrication are described later.

The place where the lubricant for initial lubrication is enclosed is not specifically limited. To allow the lubricant for initial lubrication to be present in the rolling portion and the sliding portion in initial lubrication, it is preferable to enclose the lubricant for initial lubrication in the vicinity of the rolling portion and the sliding portion inside the bearing. More specifically, the lubricant for initial lubrication is enclosed in the vicinity of the rolling elements, the rolling surfaces of the inner and outer rings, and the cage. An example of the place where the lubricant for initial lubrication is enclosed is as shown in FIG. 17 (the lubricant for initial lubrication is denoted as 437).

The amount of the lubricant for initial lubrication to be enclosed inside the bearing is favorably 1 to 30 vol % and more favorably 3 to 20 vol % of the volume of the space inside the bearing. If the amount of the lubricant for initial lubrication to be enclosed inside the bearing is too small, the amount thereof is insufficient for utilizing it as the lubricant for initial lubrication. If the amount of the lubricant for initial lubrication to be enclosed inside the bearing is too large, the filling amount of the foam lubricant is small. Thus the foam lubricant is incapable of contribute to lubrication for a long time. Thus there occurs a problem in the durability.

The foam lubricant of the present invention is described in detail below.

The foam lubricant of the present invention contains the lubricating component in the resin which foams, hardens, and becomes porous. The foam lubricant "exudes the lubricating component gradually therefrom to the outside owing to external stresses such as centrifugal force, compression, flexure, and expansion". Therefore in an early stage of rotation, there is a case in which the lubricating component is not sufficiently present at the sliding portion and the like. The grease and the lubricating oil are easily moved inside the constant velocity universal joint and the bearing by the above-described external stresses. Therefore when even a small amount of the lubricant for initial lubrication consisting of the grease or the lubricating oil is enclosed at the bottom of the outer member of the constant velocity universal joint, a portion of the cage window in the vicinity of the torque transmission member thereof, a portion of the bearing in the vicinity of the rolling element thereof, portions in the vicinity of rolling surfaces of the inner and outer rings, and a portion in the vicinity of the cage, the lubricant for initial lubrication rapidly moves to the inside of the constant velocity universal joint and to the rolling surface of the bearing, thus acting as the lubricant in early-stage lubrication until the lubricating component is sufficiently discharged from the foam lubricant.

In the present invention, owing to the flexibility of the resin and for example, owing to deformation of the foam lubricant caused by the external force such as compression, expansion, flexure, twist, and the like, the lubricating component can be exuded from the foam lubricant and can be gradually discharged to the outside from gaps between molecules of the resin. At this time, the exudation amount of the lubricating component such as the lubricating oil can be minimized by changing the extent of the elastic deformation which occurs in dependence on the intensity of the external force. To do so, it is necessary to select an appropriate resin.

The resin contained in the foam lubricant used in the present invention has a large surface area due to foaming. Thus the lubricating oil composing the lubricating component which has exuded in an excess amount can be temporarily held in bubbles of a foam again. Thus the amount of the lubricating oil which exudes is stable. Further by retaining the lubricating oil in the resin and impregnating the lubricating oil into the bubbles of the foam, the amount of lubricating oil is held more than in an unfoamed state.

In addition, the foam lubricant used in the present invention requires a much smaller energy than a non-foam when it is bent and is capable of flexibly deforming with the foam lubricant holding the lubricating component such as the lubricating oil therein at a high density. Therefore in the process of cooling the solidified foam lubricant, even though the foam lubricant shrinks and surrounds the rolling element and the torque transmission member, the foam lubricant requires a small energy when it bends and deforms. Therefore the foam lubricant is capable of easily deforming, thus preventing the occurrence of the problem that the rotational torque becomes large. In addition, because the foam lubricant has a lot of foamed portions, namely, porous portions, the foam lubricant is advantageous in making the bearing and the universal joint lightweight.

Because the foam lubricant used in the present invention is formed by merely foaming and hardening the mixture containing the lubricating component and the resin, it is unnecessary to prepare a special equipment and possible to mold the mixture by filling it in a desired place.

By controlling the mixing amount of the components of the mixture, the density of the foam lubricant can be changed.

It is preferable that the resin, composing the foam lubricant used in the present invention, which foams, hardens, and becomes porous has rubber-like elasticity after it foams and hardens and has the property of exuding the lubricating component owing to deformation thereof.

The resin may be foamed and hardened when it is formed or when a mixture of the resin and a foaming agent added thereto is molded. The "hardening" means a crosslinking reaction and/or a phenomenon in which a liquid material solidifies. The "rubber-like elasticity" means rubber elasticity and also the restoration to its original configuration owing to the elimination of an applied external force therefrom.

As the resin which foams, hardens, and becomes porous, rubber and plastics are exemplified.

As the rubber, it is possible to list various rubbers such as natural rubber, isoprene rubber, butadiene rubber, styrene butadiene rubber, chloroprene rubber, butyl rubber, nitrile rubber, ethylene propylene rubber, silicone rubber, urethane elastomer, fluororubber, and chlorosulfone rubber.

As the plastic, it is possible to list general-purpose plastics and engineering plastics such as polyurethane resin, polyethylene resin, polypropylene resin, polystyrene resin, polyvinyl chloride resin, polyacetal resin, polyamide 4,6 resin (PA4,6), polyamide 6,6 resin (PA6,6), polyamide 6T resin (PA6T), and polyamide 9T resin (PA9T).

Of the above-described resins, it is preferable to use polyurethane resin, which easily foams, hardens, and becomes porous.

The polyurethane resin that can be used in the present invention is a foamed and hardened polymer formed by a reaction between isocyanate and polyol. It is preferable to use a foamed and hardened urethane prepolymer having an isocyanate group (—NCO) in its molecule. The isocyanate group may be blocked with other substituting groups. The isocyanate group contained in the molecules may be disposed at the termination of its molecular chain or contained at the termination of its side chain branched from the molecular chain. The urethane prepolymer may have a urethane bond in the molecular chain. A hardener for the urethane prepolymer may be polyol or polyamine.

The urethane prepolymer can be obtained by a reaction between a compound having an active hydrogen group and polyisocyanate.

As compounds having the active hydrogen group, low molecular weight polyol, polyether-based polyol, polyester-based polyol, and castor oil-based polyol are listed. These compounds can be used singly or as mixtures consisting of not less than two kinds thereof. As the low molecular weight polyol, it is possible to list bivalent low molecular weight polyols, for example, ethylene glycol, diethylene glycol, propylene glycol, 1,4-butanediol, 1,6-hexanediol, neopentyl glycol, and hydrogenated bisphenol A are listed; and trivalent or higher low molecular weight polyols (trivalent through octavalent low molecular weight polyols), for example, glycerin, trimethylol propane, hexanetriol, pentaerythritol, sorbitol, and sucrose are listed.

As the polyether-based polyols, an addition product of the low molecular weight polyol with an alkylene oxide (alkylene oxide having two to four carbon atoms, for example, ethylene oxide, propylene oxide, and butylene oxide) and polymers obtained by ring opening polymerization of the alkylene oxide are listed. More specifically, polyethylene glycol, polypropylene glycol, polytetramethylene ether glycol are listed.

As the polyester-based polyol, polyester polyol, polycaprolacton polyol, and polyether ester polyol are listed. The polyester polyol is obtained by condensation polymerization of carboxylic acid (aliphatic saturated or unsaturated carboxylic acid, for example, adipic acid, azelaic acid, dodecanoic acid, maleic acid, fumaric acid, itaconic acid, dimerized linoleic acid and/or aromatic carboxylic acid, for example, phthalic acid, isophthalic acid) and polyol (above-described low-molecular polyol and/or polyether polyol).

The polycaprolacton polyol is obtained by addition polymerization of a polymerization initiator of glycols or triols with ϵ-caprolacton, α-methyl-ϵ-caprolacton, ϵ-methyl-ϵ-caprolacton or the like under the presence of a catalyst such as an organic metal compound, a metal chelate compound, a fatty metal acyl compound or the like. The polyether ester polyol is obtained by an addition reaction between polyester having a hydroxyl group and/or an OH group at its terminal and the alkylene oxide, for example, ethylene oxide, propylene oxide or the like. As the castor oil-based polyol, it is possible to list castor oil, esters formed by ester interchange between the castor oil or castor oil fatty acid and the low-molecular polyol, the polyether polyol or the polyester polyol; and esterified polyol.

As the polyisocyanate, aromatic diisocyanate, aliphatic diisocyanate or alicyclic diisocyanate, and polyisocyanate compounds are listed.

As the aromatic diisocyanate, diphenylmethane diisocyanate, 2,4-tolylene diisocyanate, 2,6-tolylene diisocyanate, and mixtures thereof, 1,5-naphthylene diisocyanate, 1,3-phenylene diisocyanate, and 1,4-phenylene diisocyanate are listed.

As the aliphatic or alicyclic diisocyanate, 1,6-hexamethylene diisocyanate, 1,12-dodecane diisocyanate, 1,3-cyclobutane diisocyanate, 1,3-cyclohexane diisocyanate, 1,4-cyclohexane diisocyanate, isopropane diisocyanate, 2,4-hexahydrotoluoylene diisocyanate, 2,6-hexahydrotoluoylene diisocyanate, 1,3-hexahydrophenyl diisocyanate, 1,4-hexahydrophenyl diisocyanate, 2,4'-perhydrodiphenylmethane diisocyanate, and 4,4'-perhydrodiphenylmethane diisocyanate are listed.

As the polyisocyanate compound, 4,4',4''-triphenylmethane tri-isocyanate, 4,6,4'-diphenyltriisocyanate, 2,4,4'-diphenylether tri-isocyanate, and polymethylenepolyphenyl polyisocyanate are listed.

Biuret, allophanate, carbodiimide, oxazolidone, amide, imide formed by modifying these isocyanates in part are listed.

As the urethane polymer preferable in the present invention, prepolymers, known as a casting urethane polymer, which are obtained by addition polymerization of polylactone ester polyol or polyether polyol with the polyisocyanate are exemplified.

It is preferable to use the urethane prepolymer obtained by addition polymerization of the polylacton ester polyol obtained by a ring opening reaction of caprolacton with the polyisocyanate under the presence of short-chain polyol.

As the polyether polyol, addition products of the low molecular weight polyol with the alkylene oxide and polymers obtained by ring opening polymerization of the alkylene oxide are listed. Urethane polymers obtained by the addition polymerization of the polyisocyanate with the addition products of the low molecular weight polyol with the alkylene oxide and the polymers obtained by the ring opening polymerization of the alkylene oxide are preferable.

Exemplifying commercially available products of the urethane prepolymer that can be preferably used in the present invention, Placcel EP (commercial name) produced by Daicel Chemical Industries, Ltd. is preferable. The Placcel EP is a white solid urethane prepolymer having a melting point not less than a room temperature. Exemplifying the polyether polyol, Preminol (commercial name) produced by Asahi Glass Co., Ltd is preferable. The Preminol has a molecular weight of 5000 to 12000.

As hardeners for hardening the urethane prepolymer, it is possible to use aromatic polyamines represented by 3,3'-dichloro-4,4'-diaminodiphenylmethane (herein after referred to as MOCA), 4,4'-diamino-3,3'-diethyl-5,5'-dimethyldiphenylmethane, trimethylene-bis-(4-aminobenzoate), bis(methylthio)-2,4-toluenediamine, bis(methylthio)-2,6-toluenediamine, methylthiotoluenediamine, 3,5-diethyltoluene-2,4-diamine, and 3,5-diethyltoluene-2,6-diamine; low molecular weight polyols represented by the above-described polyisocyanate, 1,4-butane glycol, and trimethylolpropane; polyether polyol; castor oil-based polyol; polyester-based polyol; hydroxyl terminated liquid polybutadiene; hydroxyl terminated liquid polyisoprene; hydroxyl terminated liquid polyolefin-based polyol; and liquid rubber represented by compounds, having not less than two hydroxyl groups, which are obtained by modifying the terminal hydroxyl group of the above-described compounds with an isocyanate group or an epoxy group. These compounds can be used singly or in combination. Of these compounds, the aromatic polyamine is preferable for hardening the urethane prepolymer obtained by addition polymerization of the polylacton ester polyol with the polyisocyanate, because the aromatic polyamine has foaming property and rubber-like elasticity and is industrially very available.

As means for foaming the resin to obtain the foam lubricant, known foaming means are adopted. For example, it is possible to list a chemical foaming method of generating a volatile gas by a chemical reaction, a physical method of heating and vaporizing water or an organic solvent such as acetone, hexane, and the like having a comparatively low boiling point; a mechanical foaming method of blowing an inactive gas such as nitrogen or air into the subassembly from outside; and a method of using a dissolving-type foaming agent such as azobisisobutylonitrile (AIBN), azodicarbonamide (ADCA), which generate a nitrogen gas or the like by heating treatment or optical irradiation.

The urethane prepolymer which is used in the present invention has an isocyanate group in its molecule. Thus it is preferable to use a chemical foaming method by means of carbon dioxide generated by a chemical reaction between the isocyanate group and water molecules by using water as a foaming agent. This method is preferable because the method easily generates open cells.

When a chemical foaming method accompanied by the above-described reaction is used, it is preferable to use a catalyst as necessary. For example, a tertiary amine catalyst and an organic metal catalyst are used. As the tertiary amine catalyst, monoamines, diamines, triamines, cyclic amines, alcohol amines, ether amines, derivatives of imidazole, and an acid-blocked amine catalyst are listed.

As the organic metal catalyst, stannous octoate, dibutyltin diacetate, dibutyltindilaurate, dibutyltin mercaptide, dibutyltin thiocarboxylate, dibutyltin maleate, dioctyltin dimercaptide, dioctyltin thiocarboxylate, and octenoate are listed. A plurality of these catalysts may be used as a mixture to adjust a balance in the reaction.

In addition to the above-described resins, it is possible to use various adhesive agents such as a urethane-based adhesive agent, a cyanoacrylate-based adhesive agent, an epoxy-based adhesive agent, a polyvinyl acetate-based adhesive agent, and a polyimide-based adhesive agent by foaming and hardening these adhesive agents.

In the present invention, various additives may be added to the resin which foams, hardens, and becomes porous as necessary. As the additives, an antioxidant represented by hindered phenol-based antioxidant, a reinforcing agent (carbon black, white carbon, colloidal silica, and the like), an inorganic filler (calcium carbonate, barium sulfate, talc, clay, silica powder, and the like), an age resistor, a fire retardant, a metal deactivator agent, antistatic agent, a fungal-resistant agent, a filler, and a coloring agent are listed.

Any kind of the lubricating component which composes the foam lubricant together with the resin which foams, hardens, and becomes porous can be used in the present invention, provided that the lubricating component does not dissolve therein a solid component forming the foam. As the lubricating component, it is possible to use lubricating oil, grease, wax, and the like singly or as a mixture consisting of not less than two kinds thereof.

As the lubricating oil, mineral oil such as paraffin oil and naphthene oil, ester-based synthetic oil, ether-based synthetic oil, hydrocarbon-based synthetic oil, GTL base oil, fluorine oil, and silicone oil are listed. These lubricating oils can be used singly or as mixed oils.

In the case where the resin which foams, hardens, and becomes porous and the lubricating oil do not dissolve or disperse in each other owing to a chemical incompatibility such as polarity, by using lubricating oil whose viscosity is close to that of the resin, they can be physically easily mixed with each other. Thereby it is possible to prevent the segregation of the lubricating oil.

The grease is formed by adding a thickener to a base oil. As the base oil, the above-described lubricating oils can be listed. As the thickener, soaps such as lithium soap, lithium complex soap, calcium soap, calcium complex soap, aluminum soap, and aluminum complex soap; and urea-based compounds such as diurea compounds, polyurea compounds, and the like are listed. But the thickener is not limited to the above-described soaps and urea-based compounds.

The diurea compound can be obtained by a reaction between diisocyanate and monoamine. As the diisocyanate, phenylene diisocyanate, diphenyl diisocyanate, phenyl diisocyanate, diphenylmethane diisocyanate, octadecane diisocyanate, decane diisocyanate, and hexane diisocyanate are listed.

As the monoamine, octylamine, dodecylamine, hexadecylamine, octadecylamine, oleylamine, aniline, p-toluidine, and cyclohexylamine are listed.

The polyurea compound is obtained by a reaction between diisocyanate and monoamine as well as diamine. The diisocyanate and the monoamine similar to those used to form the diurea compound are listed. As the diamine, ethylenediamine, propanediamine, butanediamine, hexanediamine, octanediamine, phenylenediamine, tolylenediamine, and xylenediamine are listed.

The mixing ratio of the base oil to the grease, namely, the mixing ratio of the base oil to the entire grease component is 1 to 98 wt % and preferably 5 to 95 wt %. If the mixing ratio of the base oil to the entire grease component is less than 1 wt %, it is difficult to sufficiently supply the lubricating oil to a necessary portion. If the mixing ratio of the base oil to the entire grease component is more than 98 wt %, the grease does not solidify even at a low temperature, but remains liquid.

As wax, it is possible to list hydrocarbon-based synthetic wax, polyethylene wax, fatty ester-based wax, fatty amide-based wax, ketone-amines, and hydrogenated oil. Oil may be mixed with these waxes. As oil components that can be used, those similar to the above-described lubricating oils can be used.

The above-described lubricating components may contain various additives including a solid lubricant such as molybdenum disulfide, graphite; a friction modifier such as organic molybdenum; an oily agent such as amine, fatty acid, fats and oils; an antioxidant such as amine-based compounds and phenol-based compounds; a rust inhibitor such as petroleum sulfonate, dinonylnaphthalene sulfonate, and sorbitan ester; sulfur-based and sulfur-phosphor-based extreme pressure agents; anti-wear agents such as organic zinc and phosphor-containing compounds; a metal deactivator such as benzotriazole, sodium nitrite; and a viscosity index improver such as polymethacrylate, polystyrene.

The foam lubricant for use in the present invention is obtained by foaming and hardening the mixture containing the lubricating component, the resin, the hardener, and the foaming agent.

The mixing ratio of the lubricating component to the entire mixture is 1 to 90 wt % and preferably 5 to 80 wt %. If the mixing ratio of the lubricating component to the entire mixture is less than 1 wt %, the supply amount of the lubricating component is small and thus the lubricating component is incapable of displaying its function and a long life cannot be obtained or owing to the shortage of the lubricant, the friction coefficient increases to generate wear. If the mixing ratio of the lubricating component to the entire mixture is more than 90 wt %, the mixture does not solidify.

The mixing ratio of the resin to the entire mixture is 8 to 98 wt % and preferably 20 to 80 wt %. If the mixing ratio of the resin to the entire mixture is less than 8 wt %, the mixture does not solidify. If the mixing ratio of the resin component to the entire mixture is more than 98 wt %, the supply amount of the lubricating component is small and thus the foam lubricant does not perform its function. Therefore a long life cannot be obtained.

The mixing ratio of the hardener is determined by the mixing amount of the resin and a foaming magnification. The mixing ratio of the foaming agent is determined in terms of the foaming magnification which will be described later.

The method of mixing the components in producing the foam lubricant is not limited to a specific method, but the components can be mixed with one another by using a stirring machine ordinarily used, for example, a Henschel mixer, a ribbon mixer, a juicer mixer or a mixing head.

It is desirable to uniformly disperse molecules of each component of the mixture by using a commercially available surface active agent such as a silicone-based foam stabilizer. Independence on the kind of the foam stabilizer, it is possible to control the surface tension so as to adjust the kind of generated bubbles to open cells or closed cells. As such a surface active agent, an anionic surface active agent, a non-ionic surface active agent, a cationic surface active agent, an amphoteric surface active agent, a silicone surface active agent, and a fluorine surface active agent are listed.

The foam lubricant that is used in the present invention contains the lubricating component in the resin which foams, hardens, and becomes porous and is capable of supplying the lubricating component such as the lubricating oil to the outside by the external force such as compression, flexure, a centrifugal force, expansion of bubbles caused by a rise of temperature, and the like.

In the foam lubricant used in the present invention, it is desirable to adopt a reaction-type impregnation method of simultaneously making a foaming reaction and a hardening reaction of the resin in the presence of the lubricating component. Thereby it is possible to fill the lubricating component in the resin to a high extent and omit to carry out a later impregnation step of replenishing the resin with the lubricant by impregnating the lubricant thereinto.

On the other hand, the later impregnation method of molding a foamed solid matter in advance and impregnating the foamed solid matter with the lubricating component is incapable of permeating a sufficient amount of the liquid lubricating component into the resin. Thus this method does not have a sufficient performance of retaining the lubricating component, and the lubricating component is discharged in a short period of time. Therefore in using for a long time, there is a case where the supply of the lubricating component is short. Therefore it is preferable to adopt the later impregnation method as an auxiliary means of the reaction-type impregnation method.

It is preferable that bubbles to be generated when the resin becomes porous at the time of foaming and hardening are open cells communicating with each other so that the lubricating component is directly supplied to the outside from the surface of the resin by the external stress through the open cells. In the case of closed bubbles not communicating with one another, the whole amount of the lubricating component contained in the resin is temporarily kept in isolation in the closed cells. Thereby it is difficult for the lubricating component to move between bubbles. Thus there is a case in which a sufficient amount of the lubricating component is not supplied to the rolling portion and the sliding portion.

The open cell ratio of the foam lubricant that is used in the present invention is favorably not less than 50% and more favorably not less than 70%. If the open cell ratio is less than 50%, the lubricating component in the resin that has foamed and hardened and become porous is temporarily captured in the closed cells at a high rate. Thus there is a case in which the lubricating component is not supplied to the outside when necessary.

The open cell ratio of the foam lubricant that is used in the present invention can be computed in a procedure described below.

(1) The foam lubricant that has foamed and hardened is cut to an appropriate size to obtain a specimen A. The weight of the specimen A is measured.
(2) The specimen A is cleaned with a Soxhlet apparatus for three hours (solvent: petroleum benzine). Thereafter the specimen A is left in a constant-temperature bath at 80° C. for two hours to dry the organic solvent completely, thus specimen B is obtained. The weight of the obtained specimen B is measured.
(3) The open cell ratio is computed in a procedure described below.

Open cell ratio=(1−(weight of resin of specimen $B$−weight of resin of specimen $A$)/weight of lubricating component of specimen $A$)×100

The weight of the resin of each of the specimens A, B and that of the lubricating component thereof are computed by multiplying the weight of each of the specimens A, B by a charge ratio of each composition.

Because the lubricating component captured in the closed cells not interconnected with one another is not discharged to the outside in the Soxhlet cleaning for three hours, it cannot contribute to decreasing the weight of the specimen B. Therefore in the above-described operation, the open cell ratio can be computed by considering that the decrease amount of the weight of the example B is caused by the discharge of the lubricating component from the open cells.

It is favorable to set the foaming magnification of the foam lubricant that is used in the present invention to 1.1 to 100. It is more favorable to set the foaming magnification thereof to 1.1 to 10. If the foaming magnification of the foam lubricant is less than 1.1, the volume of a bubble is small. Thus it is impossible for the foam lubricant to deform when an external stress is applied thereto. Further because the solid matter which has become porous is so hard, it is incapable of deforming in conformity to the external stress. On the other hand, if the foaming magnification of the porous solid lubricant is more than 100, it is difficult for the porous solid lubricant to have a strength to such an extent that the porous solid lubricant withstands the external stress. Thus the porous solid lubricant may be damaged or destroyed.

In the lubricating system of the present invention and the bearing and the universal joint utilizing the lubricating system, the property and the like of the lubricant for initial lubrication that can be present together with the foam lubricant in the portion to be lubricated are described in detail below.

When the grease is used as the lubricant for initial lubrication, it is possible to use grease having a 60-time mixing worked penetration measured in accordance with JIS K 2220 5.3 is not less than 300. When the worked penetration is less than 300, the flowability of the grease is not high enough to contribute to initial lubrication and there is a case where the grease is not promptly supplied to a place requiring the lubricant.

When the grease is used as the lubricant for initial lubrication, it is possible to use grease having a degree of oil separation not less than 0.7 wt % when the grease is left 24 hours at 70° C. The degree of oil separation is measured in accordance with the method of measuring the degree of oil separation specified in JIS K 2220 11. When the degree of oil separation is less than 0.7 wt %, the exuded amount of the base oil from the grease is not large enough to contribute to the initial lubrication and there is a case where the base oil is not promptly supplied to the place such as the rolling portion and the sliding portion requiring the lubricant. When the degree of oil separation is more than or equal to 25 wt %, oil separation is so large at a room temperature that it is difficult to handle it.

As an example of the grease serving as the lubricant for initial lubrication, grease that can be used as the lubricating component of the foam lubricant is exemplified. The lubricant for initial lubrication is capable of containing various additives as well.

In case when lubricating oil is used as the lubricant for initial lubrication, it is possible to adopt lubricating oil having a kinematic viscosity not less than 50 mm$^2$/second at 40° C. measured in accordance with JIS K 2283. If the kinematic viscosity is less than 50 mm$^2$/second, the lubricating oil can be rapidly supplied to places such as the rolling portion and the sliding portion where the lubricant is necessary, but it is difficult to stay the lubricating oil there. In addition, because it is difficult to form an oil film, metal contact is liable to occur.

As an example of the lubricating oil serving as the lubricant for initial lubrication, lubricating oil that can be used as the lubricating component of the foam lubricant is exemplified. Similarly the lubricating oil is capable of containing various additives.

In the lubricating system, the lubricant for initial lubrication consisting of the grease or the lubricating oil is present at least at the sliding portion and the like to be lubricated. Thereby the lubricant for initial lubrication is capable of contributing to the initial lubrication of the lubricating system until the lubricating component sufficiently exudes from the foam lubricant.

Subsequently to the initial lubrication, the lubricating function can be accomplished by the lubricating component which exudes from the foam lubricant. Therefore lubricating component is sufficiently and continuously present at the sliding portion of the bearing, the universal joint, and the like of the present invention from the time of the initial lubrication. Therefore the lubricating system is excellent in initial adaptability and is capable of satisfying the demand for the development of the bearing, the universal joint, and the like having a long life and a low cost.

EXAMPLES

As the lubricant for initial lubrication used in examples and comparative examples described below, grease and lubricating oil shown below were used. The worked penetration was measured in accordance with JIS K 2220 5.3.
<Preparation of Grease for Initial Lubrication>
[Grease A]

9.16 g of diphenylmethane-4,4-diisocyanate and 7.84 g of p-toluidine were allowed to react with each other in 83 g of mineral oil (turbine 100 produced by Nippon Oil Corporation). The formed diurea compound was uniformly dispersed to obtain a grease A. The measured worked penetration was 335.
[Grease B]

3.94 g of diphenylmethane-4,4-diisocyanate and 4.07 g of octylamine were allowed to react with each other in 92 g of mineral oil (turbine 100 produced by Nippon Oil Corporation). The formed diurea compound was uniformly dispersed to obtain a grease B. The measured worked penetration was 320.
[Grease C]

9.70 g of diphenylmethane-4,4-diisocyanate and 8.30 g of the p-toluidine were allowed to react with each other in 82 g of the mineral oil (turbine 100 produced by Nippon Oil Corporation). The formed diurea compound was uniformly dispersed to obtain a grease C. The measured worked penetration was 325. The grease C was left for 24 hours at 70° C. to measure the degree of oil separation thereof in conformity to JIS K 2220. The measured degree of oil separation thereof was 0.75 wt %.
[Grease D]

4.63 g of diphenylmethane-4,4-diisocyanate, 2.39 g of octylamine, and 4.98 g of stearylamine were allowed to react with one another in 88 g of mineral oil (turbine 100 produced by Nippon Oil Corporation). The formed diurea compound was uniformly dispersed to obtain a grease D. The measured worked penetration was 290. The grease D was left for 24 hours at 70° C. to measure the degree of oil separation thereof in conformity to JIS K 2220. The measured degree of oil separation thereof was 0.80 wt %.
[Grease E]

5.9 g of diphenylmethane-4,4-diisocyanate and 6.1 g of the octylamine were allowed to react with one another in 88 g of the mineral oil (turbine 100 produced by Nippon Oil Corporation). The formed diurea compound was uniformly dispersed to obtain a grease E. The measured worked penetration was 270. The grease E was left for 24 hours at 70° C. to measure the degree of oil separation thereof in conformity to JIS K 2220. The measured degree of oil separation thereof was 0.30 wt %.
<Lubricating Oil for Initial Lubrication>
[Lubricating Oil A]

Turbine 100 produced by Nippon Oil Corporation having a kinematic viscosity of 100 mm$^2$/second at 40° C.
[Lubricating Oil B]

Superoil N460 produced by Nippon Oil Corporation having a kinematic viscosity of 523 mm$^2$/second at 40° C.
[Lubricating Oil C]

Superoil N7 produced by Nippon Oil Corporation having a kinematic viscosity of 6.8 mm$^2$/second at 40° C.

Examples 1 and 2

Initially 5 g of the grease for initial lubrication shown in table 1 was enclosed in the bottom portion of the outer member of a fixed-type eight-ball joint sub-assembly (EBJ82 produced by NTN corporation, outer diameter: 72.6 mm), shown in FIG. 1, which was constructed of the outer member 2, the inner member 1, the cage 6, and the torque transmission members 5. Thereafter of the components shown in table 1, the components (a), (d), (e), and (i) were sufficiently mixed with one another at 80° C. After the component (b) which dissolved at 120° C. was added to the mixture of the components, all the components were rapidly mixed with one other. After the components (c) and (h) were supplied to the mixture finally, all the components were stirred. 15.0 g of the mixture of the components was enclosed inside the above-described joint in which the grease for the initial lubrication was enclosed. A foaming reaction started in several second. After the foam lubricant was left for 30 minutes in a constant-temperature bath set to 100° C. to harden it, a boot, a shaft, and other members were mounted on the sub-assembly to obtain a specimen of each of constant velocity universal joints in which the lubricating system was utilized. A test for examining an initial characteristic and an endurance test shown below were conducted on the obtained specimens to measure the appearance situation of the initial characteristic thereof and the life period of time thereof. Based on the method of computing the above-described open cell ratio, the open cell ratio of each foam lubricant was measured. Table 1 shows the results.

<Initial Characteristic Test Conducted by Using Constant Velocity Universal Joint>

To evaluate whether a desired initial characteristic was obtained, the specimen of each constant velocity universal joint was evaluated in the following conditions. It was evaluated that the specimen which exceeded 100° C. in the temperature of the surface of the outer member thereof during the test had an abnormal temperature rise. In this case, the test was finished. After the test finished, the inside of each specimen was inspected. It was evaluated that the specimen which did not have internal damage such as wear, peeling, and the like was acceptable and the specimen was marked by "○". It was evaluated that the specimen which had damage was unacceptable and the specimen was marked by "X".

Torque: 451 N·m
Angle: six degrees
Number of rotations: 580 rpm
Test period of time: one hour <Endurance Test Conducted by Using Constant Velocity Universal Joint>

To evaluate the improvement of durability, the specimen of each constant velocity universal joint was evaluated in the following conditions. It was evaluated that the specimen which exceeded 100° C. in the temperature of the surface of the outer member thereof during the test had an abnormal temperature rise. In this case, the test was finished. After a predetermined period of time elapsed, the inside of each specimen was inspected. It was evaluated that the specimen which did not have internal damage such as abnormal wear, peeling, and the like and the specimen which had a low extent of internal damage and could be continuously operated were acceptable and the specimens were marked by "○". It was evaluated that the specimen which had a high extent of damage and could not be continuously operated was unacceptable and the specimen was marked by "X".

Torque: 725 N·m
Angle: six degrees
Number of rotations: 230 rpm
Test period of time: 150 hours Examples 3 and 4

Initially 5 g of the grease for initial lubrication shown in table 1 was enclosed at the bottom portion of the outer member of a fixed-type eight-ball joint sub-assembly (EBJ82 produced by NTN corporation, outer diameter: 72.6 mm), shown in FIG. 1, which was constructed of the outer member 2, the inner member 1, the cage 6, and the torque transmission members 5. After a silicone-based foam stabilizer, mineral oil, an amine catalyst, and water serving as a foaming agent were added to polyether polyol in the amounts (composition) shown in table 1, the mixture was heated at 90° C. and sufficiently stirred. After isocyanate was added to the mixture, the mixture was sufficiently stirred. Thereafter 13.0 g of the mixture was enclosed inside the above-described joint in which the grease for initial lubrication was enclosed. A foaming reaction started in several second. After the foam lubricant was left for 15 minutes in a constant-temperature bath set to 90° C. to harden it, a boot, a shaft, and other members were mounted on the sub-assembly to obtain a specimen of each constant velocity universal joint utilizing the lubricating system. The same items as those measured in the example 1 were also measured on the obtained specimens. Table 1 shows the results.

Comparative Example 1

By using the composition shown in table 1, a constant velocity universal joint specimen was made in a procedure similar to that adopted in the example 2 without enclosing the grease for initial lubrication in the specimen. The same items as those measured in the example 1 were measured on the obtained specimen. Table 1 shows the results.

Comparative Example 2

By using the composition shown in table 1, a constant velocity universal joint specimen was made in a procedure similar to that adopted in the example 3 without enclosing the grease for initial lubrication in the specimen. The same items as those measured in the example 1 were measured on the obtained specimen. Table 1 shows the results.

Comparative Example 3

By using the composition shown in table 1, a constant velocity universal joint specimen was made in a procedure similar to that adopted in the example 1. The grease E having the worked penetration of 270 was used as the grease for initial lubrication. The same items as those measured in the example 1 were measured on the obtained specimen. Table 1 shows the results.

Comparative Example 4

By using the composition shown in table 1, a constant velocity universal joint specimen was made in a procedure similar to that adopted in the example 4 without using the silicone-based foam stabilizer. The grease B having the worked penetration of 320 was used as the grease for initial lubrication. The same items as those measured in the example 1 were measured on the obtained specimen. Table 1 shows the results.

TABLE 1

|  |  | Example | | | | Comparative example | | | |
| --- | --- | --- | --- | --- | --- | --- | --- | --- | --- |
|  |  | 1 | 2 | 3 | 4 | 1 | 2 | 3 | 4 |
| Components of foam lubricant (wt %) | | | | | | | | | |
| (a) Urethane prepolymer | Placcel EP1130 (Daicel Chemical Industries, Ltd.) | 64 | 67 | — | — | 67 | — | 64 | — |
| (b) Amine-based hardener | Iharacuamine MT (Ihara Chemical Industry Co., Ltd.) | 3.2 | 3.3 | — | — | 3.3 | — | 3.2 | — |
| (c) Water | Ion exchange water | 0.5 | 0.5 | 0.5 | 0.5 | 0.5 | 0.5 | 0.5 | 0.5 |
| (d) Silicone-based foam stabilizer | SRX298 (Dow Corning Toray Co., Ltd.) | 0.3 | 0.4 | 0.5 | 0.2 | 0.4 | 0.5 | 0.3 | — |
| (e) Urea-based grease | Pyronoc Universal N6C (Nippon Oil Corporation) | 31.7 | 18.4 | — | — | 18.4 | — | 31.7 | — |
| (f) Isocyanate | Coronate T80 (Nippon Polyurethane Industry Co., Ltd) | — | — | 8.5 | 8.5 | — | 8.5 | — | 8.5 |
| (g) Polyether polyol | Preminol SX4004 (Asahi Glass Co., Ltd.) | — | — | 20 | 20 | — | 20 | — | 20 |

TABLE 1-continued

|  |  | Example | | | | Comparative example | | | |
| --- | --- | --- | --- | --- | --- | --- | --- | --- | --- |
|  |  | 1 | 2 | 3 | 4 | 1 | 2 | 3 | 4 |
| (h) Amine-based catalyst | TOYOCAT DM70 (Tosoh Corporation) | 0.3 | 0.4 | 0.5 | 0.5 | 0.4 | 0.5 | 0.3 | 0.5 |
| (i) Lubricating oil | Turbine 100 (Nippon Oil Corporation) | — | 10 | 70 | 70.3 | 10 | 70 | — | 70.5 |
| Total |  | 100 | 100 | 100 | 100 | 100 | 100 | 100 | 100 |
|  | Lubricant for initial lubrication | | | | | | | | |
| Grease A | Aromatic urea - mineral oil, worked penetration: 335 | 5 g | — | 5 g | — | — | — | — | — |
| Grease B | Aliphatic urea - mineral oil, worked penetration: 320 | — | 5 g | — | 5 g | — | — | — | 5 g |
| Grease E | Aliphatic urea - mineral oil, worked penetration: 270 | — | — | — | — | — | — | 5 g | — |
| Open cell ratio (%) |  | 80 | 75 | 65 | 50 | 75 | 65 | 80 | 40 |
| Judgement in initial characteristic test |  | ○ | ○ | ○ | ○ | X | X | X | ○ |
| Judgement in endurance test |  | ○ | ○ | ○ | ○ | X | X | X | X |

Examples 5 and 6

Initially 5 g of the grease for initial lubrication shown in table 2 was enclosed at the bottom portion of the outer member of a fixed-type eight-ball joint sub-assembly (EBJ82 produced by NTN corporation, outer diameter: 72.6 mm), shown in FIG. 1, which was constructed of the outer member 2, the inner member 1, the cage 6, and the torque transmission members 5. Thereafter of the components shown in table 2, the components (a), (d), (e), and (i) were sufficiently mixed with one another at 80° C. After the component (b) which dissolved at 120° C. was added to the mixture of the components, the components were rapidly mixed with one other. After the components (c) and (h) were supplied to the mixture of the components finally, the components were stirred. Finally 15.0 g of the mixture of the components was enclosed inside the above-described joint in which the grease for initial lubrication was enclosed. A foaming reaction started in several second. After the foam lubricant was left for 30 minutes in the constant-temperature bath set to 100° C. to harden it, a boot, a shaft, and other members were mounted on the sub-assembly to obtain a specimen of each constant velocity universal joint in which the lubricating system was utilized. The same items as those measured in the example 1 were also measured on the obtained specimens. Table 2 shows the results.

Examples 7 and 8

Initially 5 g of the grease for initial lubrication shown in table 2 was enclosed at the bottom portion of the outer member of a fixed-type eight-ball joint sub-assembly (EBJ82 produced by NTN corporation, outer diameter: 72.6 mm), shown in FIG. 1, which was constructed of the outer member 2, the inner member 1, the cage 6, and the torque transmission members 5. After the silicone-based foam stabilizer, the mineral oil, the amine catalyst, and the water serving as the foaming agent were added to the polyether polyol in the amounts (composition) shown in table 2, the mixture was heated at 90° C. and sufficiently stirred. Thereafter the isocyanate was added to the mixture, and the mixture was sufficiently stirred. Thereafter 13.0 g of the mixture of these components was enclosed inside the above-described joint in which the grease for initial lubrication was enclosed. A foaming reaction started in several second. After the foam lubricant was left for 15 minutes in the constant-temperature bath set to 90° C. to harden it, a boot, a shaft, and other members were mounted on the sub-assembly to obtain a specimen of each constant velocity universal joint in which the lubricating system was utilized. The same items as those measured in the example 1 were also measured on the obtained specimens. Table 2 shows the results.

Comparative Example 5

By using the composition shown in table 2, a constant velocity universal joint specimen was made in a procedure similar to that adopted in the example 6 without enclosing the grease for initial lubrication in the specimen. The same items as those measured in the example 1 were measured on the obtained specimen. Table 2 shows the results.

Comparative Example 6

By using the composition shown in table 2, a constant velocity universal joint specimen was made in a procedure similar to that adopted in the example 7 without enclosing the grease for initial lubrication in the specimen. The same items as those measured in the example 1 were measured on the obtained specimen. Table 2 shows the results.

Comparative Example 7

By using the composition shown in table 2, a constant velocity universal joint specimen was made in a procedure similar to that adopted in the example 5. The grease E having the degree of oil separation of 0.3 wt % was used as the grease for initial lubrication. The same items as those measured in the example 1 were measured on the obtained specimen. Table 2 shows the results.

Comparative Example 8

By using the composition shown in table 2, a constant velocity universal joint specimen was made in a procedure similar to that adopted in the example 8 without using the silicone-based foam stabilizer. The grease D having the degree of oil separation of 0.8 wt % was used as the grease for initial lubrication. The same items as those measured in the example 1 were measured on the obtained specimen. Table 2 shows the results.

TABLE 2

| | | Example | | | | Comparative example | | | |
|---|---|---|---|---|---|---|---|---|---|
| | | 5 | 6 | 7 | 8 | 5 | 6 | 7 | 8 |
| Components of foam lubricant (wt %) | | | | | | | | | |
| (a) Urethane prepolymer | Placcel EP1130 (Daicel Chemical Industries, Ltd.) | 64 | 67 | — | — | 67 | — | 64 | — |
| (b) Amine-based hardener | Iharacuamine MT (Ihara Chemical Industry Co., Ltd.) | 3.2 | 3.3 | — | — | 3.3 | — | 3.2 | — |
| (c) Water | Ion exchange water | 0.5 | 0.5 | 0.5 | 0.5 | 0.5 | 0.5 | 0.5 | 0.5 |
| (d) Silicone-based foam stabilizer | SRX298 (Dow Corning Toray Co., Ltd.) | 0.3 | 0.4 | 0.5 | 0.2 | 0.4 | 0.5 | 0.3 | — |
| (e) Urea-based grease | Pyronoc Universal N6C (Nippon Oil Corporation) | 31.7 | 18.4 | — | — | 18.4 | — | 31.7 | — |
| (f) Isocyanate | Coronate T80 (Nippon Polyurethane Industry Co., Ltd) | — | — | 8.5 | 8.5 | — | 8.5 | — | 8.5 |
| (g) Polyether polyol | Preminol SX4004 (Asahi Glass Co., Ltd.) | — | — | 20 | 20 | — | 20 | — | 20 |
| (h) Amine-based catalyst | TOYOCAT DM70 (Tosoh Corporation) | 0.3 | 0.4 | 0.5 | 0.5 | 0.4 | 0.5 | 0.3 | 0.5 |
| (i) Lubricating oil | Turbine 100 (Nippon Oil Corporation) | — | 10 | 70 | 70.3 | 10 | 70 | — | 70.5 |
| Total | | 100 | 100 | 100 | 100 | 100 | 100 | 100 | 100 |
| Lubricant for initial lubrication | | | | | | | | | |
| Grease C | Aromatic urea - mineral oil; worked penetration: 325; degree of detachment: 0.75 wt % | 5 g | — | 5 g | — | — | — | — | — |
| Grease D | Aliphatic urea - mineral oil; worked penetration: 290; degree of detachment: 0.80 wt % | — | 5 g | — | 5 g | — | — | — | 5 g |
| Grease E | Aliphatic urea - mineral oil; worked penetration: 270; degree of detachment: 0.30 wt % | — | — | — | — | — | — | 5 g | — |
| Open cell ratio (%) | | 80 | 75 | 65 | 50 | 75 | 65 | 80 | 40 |
| Judgement in initial characteristic test | | ○ | ○ | ○ | ○ | X | X | X | ○ |
| Judgement in endurance test | | ○ | ○ | ○ | ○ | X | X | X | X |

In the examples 1 through 8, in the initial characteristic test conducted by using the constant velocity universal joint, wear which occurs owing to the shortage of a lubricant in the initial period of time was not recognized, thus favorable results were shown. In the comparative examples 1 through 3 and the comparative examples 5 through 7, in the initial characteristic test, wear was recognized at the sliding portions. In the comparative examples 1, 2, 5, and 6, because the discharge of the lubricating component in the initial period of time was not in time, the lubricant was short. In the comparative example 3, the grease used for the initial lubrication was inferior in its flowability. In the comparative example 7, the oil separation of the grease used for the initial lubrication was insufficient. Thus in both comparative examples 3 and 7, the grease was not promptly supplied to the sliding portion, and the shortage of a lubricant in the initial period of time could not be compensated.

Example 9

Initially 5 g of lubricating oil for initial lubrication shown in table 3 was enclosed at the bottom portion of the outer member of the fixed-type eight-ball joint sub-assembly (EBJ82 produced by NTN corporation, outer diameter: 72.6 mm), shown in FIG. 1, which was constructed of the outer member 2, the inner member 1, the cage 6, and the torque transmission members 5. Thereafter of the components shown in table 3, the components (a), (d), and (e) were sufficiently mixed with one another at 80° C. After the component (b) which dissolved at 120° C. was added to the mixture of the components, the components were rapidly mixed with one other. After the components (c) and (h) were supplied to the mixture of the components finally, the mixture of the components was stirred. 15.0 g of the mixture of the components was enclosed inside the above-described joint in which the lubricating oil for initial lubrication was enclosed. A foaming reaction started in several second. After the foam lubricant was left for 30 minutes in the constant-temperature bath set to 100° C. to harden it, a boot, a shaft, and other members were mounted on the sub-assembly to obtain the specimen of each constant velocity universal joint in which the lubricating system was utilized. The same items as those measured in the example 1 were also measured on the obtained specimens. Table 3 shows the results.

Example 10

Of the components shown in table 3, the components (a), (d), (e), and (i) were sufficiently mixed with one another at 80° C. The component (b) which dissolved at 120° C. was added to the mixture of the components. After the components (c) and (h) were supplied to the mixture of the components finally, the mixture of the components was stirred. 18.0 g of the mixture was enclosed inside the fixed-type eight-ball joint sub-assembly (EBJ82 produced by NTN corporation, outer diameter: 72.6 mm), shown in FIG. 2, which was constructed of the outer member 2, the inner member 1, the cage 6, and the torque transmission members 5. A foaming reaction started in several seconds. The foam lubricant was left for 30 minutes in the constant-temperature bath set to 100° C. to harden it. After the foam lubricant hardened, the lubricating oil for initial lubrication shown in table 3 was injected into a portion of eight cage windows in the vicinity of the torque transmission members 5 thereof by an injector. Thereafter a boot, a shaft, and other members were mounted on the sub-assembly to obtain a specimen of a constant velocity universal joint in which the lubricating system was utilized. The same items as those measured in the example 1 were also measured on the obtained specimens. Table 3 shows the results.

Examples 11 and 12

Initially 5 g of the lubricating oil for initial lubrication shown in table 3 was enclosed at the bottom portion of the outer member of a fixed-type eight-ball joint sub-assembly (EBJ82 produced by NTN corporation, outer diameter: 72.6 mm), shown in FIG. 1, which was constructed of the outer member 2, the inner member 1, the cage 6, and the torque transmission members 5. After the silicone-based foam stabilizer, the mineral oil, the amine catalyst, and the water serving as the foaming agent were added to polyether polyol in the amounts (composition) shown in table 3, the mixture of the components was heated at 90° C. and sufficiently stirred. Thereafter the isocyanate was added to the mixture. After the mixture was sufficiently stirred, 13.0 g of the mixture of these components was enclosed inside the above-described joint in which lubricating oil for initial lubrication was enclosed. A foaming reaction started in several second. After the foam lubricant was left for 15 minutes in the constant-temperature bath set to 90° C. to harden it, a boot, a shaft, and other members were mounted on the sub-assembly to obtain a specimen of each constant velocity universal joint in which the lubricating system was utilized. The same items as those measured in the example 1 were also measured on the obtained specimens. Table 3 shows the results.

Comparative Example 9

By using the composition shown in table 3, a constant velocity universal joint specimen was made in a procedure similar to that adopted in the example 9. The lubricating oil C having the kinematic viscosity of 6.8 mm²/second was used as the lubricating oil for initial lubrication. The same items as those measured in the example 1 were measured on the obtained specimen. Table 3 shows the results.

Comparative Example 12

By using the composition shown in table 3, a constant velocity universal joint specimen was made in a procedure similar to that adopted in the example 12 without using the silicone-based foam stabilizer. The lubricating oil B having the kinematic viscosity of 523 mm²/second was used as the lubricating oil for initial lubrication. The same items as those measured in the example 1 were measured on the obtained specimen. Table 3 shows the results.

TABLE 3

| | | Example | | | | Comparative example | | | |
|---|---|---|---|---|---|---|---|---|---|
| | | 9 | 10 | 11 | 12 | 9 | 10 | 11 | 12 |
| Components of foam lubricant (wt %) | | | | | | | | | |
| (a) Urethane prepolymer | Placcel EP1130 (Daicel Chemical Industries, Ltd.) | 64 | 67 | — | — | 67 | — | 64 | — |
| (b) Amine-based hardener | Iharacuamine MT (Ihara Chemical Industry Co., Ltd.) | 3.2 | 3.3 | — | — | 3.3 | — | 3.2 | — |
| (c) Water | Ion exchange water | 0.5 | 0.5 | 0.5 | 0.5 | 0.5 | 0.5 | 0.5 | 0.5 |
| (d) Silicone-based foam stabilizer | SRX298 (Dow Corning Toray Co., Ltd.) | 0.3 | 0.4 | 0.5 | 0.2 | 0.4 | 0.5 | 0.3 | — |
| (e) Urea-based grease | Pyronoc Universal N6C (Nippon Oil Corporation) | 31.7 | 18.4 | — | — | 18.4 | — | 31.7 | — |
| (f) Isocyanate | Coronate T80 (Nippon Polyurethane Industry Co., Ltd) | — | — | 8.5 | 8.5 | — | 8.5 | — | 8.5 |
| (g) Polyether polyol | Preminol SX4004 (Asahi Glass Co., Ltd.) | — | — | 20 | 20 | — | 20 | — | 20 |
| (h) Amine-based catalyst | TOYOCAT DM70 (Tosoh Corporation) | 0.3 | 0.4 | 0.5 | 0.5 | 0.4 | 0.5 | 0.3 | 0.5 |
| (i) Lubricating oil | Turbine 100 (Nippon Oil Corporation) | — | 10 | 70 | 70.3 | 10 | 70 | — | 70.5 |
| Total | | 100 | 100 | 100 | 100 | 100 | 100 | 100 | 100 |
| Lubricant for initial lubrication | | | | | | | | | |
| Lubricating oil A | Turbine 100 (Nippon Oil Corporation) kinematic viscosity: 100 mm²/second (40° C.) | 5 g | — | 5 g | — | — | — | — | — |
| Lubricating oil B | Superoil N460 (Nippon Oil Corporation) kinematic viscosity: 523 mm²/second (40° C.) | — | 5 g | — | 5 g | — | — | — | 5 g |
| Lubricating oil C | Superoil N7 (Nippon Oil Corporation) kinematic viscosity: 6.8 mm²/second (40° C.) | — | — | — | — | — | — | 5 g | — |
| Open cell ratio (%) | | 80 | 75 | 65 | 50 | 75 | 65 | 80 | 40 |
| Judgement in initial characteristic test | | ○ | ○ | ○ | ○ | X | X | X | ○ |
| Judgement in endurance test | | ○ | ○ | ○ | ○ | X | X | X | X | similar to that adopted in the example 10 without enclosing the lubricating oil for initial lubrication in the specimen. The same items as those measured in the example 1 were measured on the obtained specimen. Table 3 shows the results.

Comparative Example 10

By using the composition shown in table 3, a constant velocity universal joint specimen was made in a procedure similar to that adopted in the example 11 without enclosing the lubricating oil for initial lubrication in the specimen. The same items as those measured in the example 1 were measured on the obtained specimen. Table 3 shows the results.

Comparative Example 11

By using the composition shown in table 3, a constant velocity universal joint specimen was made in a procedure In the examples 9 through 12, in the initial characteristic test conducted by using the constant velocity universal joint, wear which occurs owing to the shortage of a lubricant in the initial period of time was not recognized, thus favorable results were shown. In the comparative examples 9 through 11, in the initial characteristic test, wear was recognized at the sliding portions. In the comparative examples 9 and 10, because the discharge of the lubricating component in the initial period of time was not in time, a lubricant was short. In the comparative example 11, the grease used for the initial lubrication was low in its viscosity. Therefore although the lubricant was rapidly supplied to the sliding portion, the lubricant was incapable of remaining there. Thereby the shortage of a lubricant in the initial period of time could not be compensated.

Example 13

Of the components shown in table 4, urethane prepolymer (a), silicone-based foam stabilizer (d), and urea-based grease (e) were sufficiently mixed with one another at 80° C. After an amine-based hardener (b) which dissolved at 120° C. was added to the mixture of the components, the components were rapidly mixed one another. After water (c) and an amine-based catalyst (h) were supplied to the mixture of the components finally, the mixture of the components was stirred. 17.0 g of the mixture obtained by stirring was filled between the outer member 2 and the inner member 1 of a fixed-type eight-ball joint sub-assembly (EBJ82 produced by NTN corporation, outer diameter: 72.6 mm). A foaming reaction started in several seconds. After the foam lubricant was left for 30 minutes in the constant-temperature bath set to 100° C. to harden it, the grease for initial lubrication was injected into eight positions of the track portion in the vicinity of the torque transmission member (ball) thereof by the injector (see FIG. 3). Thereafter a boot, a shaft, and other members were mounted on the sub-assembly to obtain a specimen of a constant velocity universal joint. The same items as those measured in the example 1 were also measured on the obtained specimen. Table 4 shows the results.

Example 14

Of the components shown in table 4, the urethane polymer (a), the silicone-based foam stabilizer (d), the urea-based grease (e), and the lubricating oil (i) were sufficiently mixed with one another at 80° C. After an amine-based hardener (b) which dissolved at 120° C. was added to the mixture of the components, the components were rapidly mixed with one another. After the water (c) and the amine-based catalyst (h) were supplied to the mixture of the components finally, the mixture of the components was stirred. Finally 17.0 g of the obtained mixture was filled between the outer member 2 and the inner member 1 of a fixed-type eight-ball joint sub-assembly (EBJ82 produced by NTN corporation, outer diameter: 72.6 mm). A foaming reaction started in several seconds. After the foam lubricant was left for 30 minutes in the constant-temperature bath set to 100° C. to harden it, the lubricating oil for initial lubrication was injected to the outside and inside surfaces of the cage by the injector. Thereafter a boot, a shaft, and other members were mounted on the sub-assembly to obtain a specimen of a constant velocity universal joint. The same items as those measured in the example 1 were also measured on the obtained specimen. Table 4 shows the results.

Examples 15 and 16

In the components shown in table 4, after the silicone-based foam stabilizer (d), the lubricating oil (i), the amine catalyst (h), and the water (c) serving as the foaming agent were added to polyether polyol (g), the mixture was heated at 90° C. and sufficiently stirred. Thereafter isocyanate (f) was added to the mixture of these components, and the mixture was sufficiently stirred. Thereafter 15.0 g of the obtained mixture of these components was filled between the outer member 2 and the inner member 1 of a fixed-type eight-ball joint sub-assembly (EBJ82 produced by NTN corporation, outer diameter: 72.6 mm). A foaming reaction started in several second. The mixture was left for 15 minutes in the constant-temperature bath set to 90° C. to harden it. After the foam lubricant hardened, the lubricant for initial lubrication shown in table 4 was injected into eight portions of the cage window in the vicinity of the torque transmission member (ball) thereof by an injector (see FIG. 2). Thereafter a boot, a shaft, and other members were mounted on the sub-assembly to obtain a specimen of each of constant velocity universal joints. The same items as those measured in the example 1 were also measured on the obtained specimens. Table 4 shows the results.

Comparative Example 13

By using the composition shown in table 4, a constant velocity universal joint specimen was made in a procedure similar to that adopted in the example 14 without enclosing the lubricant for initial lubrication in the specimen. The same items as those measured in the example 1 were measured on the obtained specimen. Table 4 shows the results.

Comparative Example 14

By using the composition shown in table 4, a constant velocity universal joint specimen was made in a procedure similar to that adopted in the example 15 without enclosing the lubricant for initial lubrication in the specimen. The same items as those measured in the example 1 were measured on the obtained specimen. Table 4 shows the results.

Comparative Example 15

By using the composition shown in table 4, a constant velocity universal joint specimen was made in a procedure similar to that adopted in the example 16 without using the silicone-based foam stabilizer. The lubricating oil B for initial lubrication shown in table 4 was used as the lubricant for initial lubrication. The same items as those measured in the example 1 were measured on the obtained specimen. Table 4 shows the results.

TABLE 4

|  |  | Example | | | | Comparative example | | |
| --- | --- | --- | --- | --- | --- | --- | --- | --- |
|  |  | 13 | 14 | 15 | 16 | 13 | 14 | 15 |
| Components of foam lubricant (wt %) | | | | | | | | |
| (a) Urethane prepolymer | Placcel EP1130 (Daicel Chemical Industries, Ltd.) | 64 | 67 | — | — | 67 | — | — |
| (b) Amine-based hardener | Iharacuamine MT (Ihara Chemical Industry Co., Ltd.) | 3.2 | 3.3 | — | — | 3.3 | — | — |
| (c) Water | Ion exchange water | 0.5 | 0.5 | 0.5 | 0.5 | 0.5 | 0.5 | 0.5 |
| (d) Silicone-based foam stabilizer | SRX298 (Dow Corning Toray Co., Ltd.) | 0.3 | 0.4 | 0.5 | 0.2 | 0.4 | 0.5 | — |
| (e) Urea-based grease | Pyronoc Universal N6C (Nippon Oil Corporation) | 31.7 | 18.4 | — | — | 18.4 | — | — |
| (f) Isocyanate | Coronate T80 (Nippon Polyurethane Industry Co., Ltd) | — | — | 8.5 | 8.5 | — | 8.5 | 8.5 |
| (g) Polyether polyol | Preminol SX4004 (Asahi Glass Co., Ltd.) | — | — | 20 | 20 | — | 20 | 20 |
| (h) Amine-based catalyst | TOYOCAT DM70 (Tosoh Corporation) | 0.3 | 0.4 | 0.5 | 0.5 | 0.4 | 0.5 | 0.5 |
| (i) Lubricating oil | Turbine 100 (Nippon Oil Corporation) | — | 10 | 70 | 70.3 | 10 | 70 | 70.5 |
| Total |  | 100 | 100 | 100 | 100 | 100 | 100 | 100 |

TABLE 4-continued

|  |  |  | Example | | | | Comparative example | | |
|---|---|---|---|---|---|---|---|---|---|
|  |  |  | 13 | 14 | 15 | 16 | 13 | 14 | 15 |
| Lubricant for initial lubrication | | | | | | | | | |
| Grease C for initial lubrication | Aromatic urea - mineral oil | worked penetration: 325 degree of detachment: 0.75 wt % | 5 g | — | 5 g | — | — | — | — |
| Lubricating oil B for initial lubrication | Superoil N460 (Nippon Oil Corporation) kinematic viscosity: 523 mm²/second (40° C.) | | — | 5 g | — | 5 g | — | — | 5 g |
| Open cell ratio (%) | | | 80 | 75 | 65 | 50 | 75 | 65 | 40 |
| Judgement in initial characteristic test | | | ○ | ○ | ○ | ○ | X | X | ○ |
| Judgement in endurance test | | | ○ | ○ | ○ | ○ | X | X | X |

Examples 17 and 18

Initially 5 g of the lubricant for initial lubrication shown in table 5 was enclosed at the bottom portion of the outer member of a fixed-type eight-ball joint sub-assembly (EBJ82 produced by NTN corporation, outer diameter: 72.6 mm), shown in FIG. 1, which was constructed of the outer member 2, the inner member 1, the cage 6, and the torque transmission members (steel balls) 5. Thereafter of the components shown in table 5, the components (a), (d), (e), and (i) were sufficiently mixed with one another at 80° C. Thereafter the component (b) which dissolved at 120° C. was added to the mixture of the components, and the components were rapidly mixed with one other. After the components (c) and (h) were supplied to the mixture of the components finally, the obtained mixture was stirred. 15.0 g of the mixture was filled in the above-described joint in which the grease for initial lubrication was enclosed. A foaming reaction started in several second. After the foam lubricant was left for 30 minutes at 100° C. to harden it, a boot, a shaft, and other members were mounted on the sub-assembly to obtain a specimen of each of constant velocity universal joints. The same items as those measured in the example 1 were also measured on the obtained specimens. Table 5 shows the results.

Examples 19 and 20

Initially 5 g of the lubricant for initial lubrication shown in table 5 was enclosed at the bottom portion of the outer member of a fixed-type eight-ball joint sub-assembly (EBJ82 produced by NTN corporation, outer diameter: 72.6 mm), shown in FIG. 1, which was constructed of the outer member 2, the inner member 1, the cage 6, and the torque transmission members (steel balls) 5. After the silicone-based foam stabilizer, the mineral oil, the amine catalyst, and the water serving as the foaming agent were added to the polyether polyol in the amounts (composition) shown in table 5, the mixture was heated at 90° C. and sufficiently stirred. After the isocyanate was added to the mixture, the obtained mixture was sufficiently stirred. Thereafter 15.0 g of the obtained mixture was filled in the above-described joint in which the lubricant for initial lubrication was enclosed. A foaming reaction started in several second. After the foam lubricant was left for 15 minutes in the constant-temperature bath set to 90° C. to harden it, a boot, a shaft, and other members were mounted on the sub-assembly to obtain a specimen of each of constant velocity universal joints. The same items as those measured in the example 1 were also measured on the obtained specimens. Table 5 shows the results.

Comparative Example 16

By using the composition shown in table 5, a constant velocity universal joint specimen was made in a procedure similar to that adopted in the example 18 without enclosing the lubricant for initial lubrication in the specimen. The same items as those measured in the example 1 were measured on the obtained specimen. Table 5 shows the results.

Comparative Example 17

By using the composition shown in table 5, a constant velocity universal joint specimen was made in a procedure similar to that adopted in the example 19 without enclosing the lubricant for initial lubrication in the specimen. The same items as those measured in the example 1 were measured on the obtained specimen. Table 5 shows the results.

Comparative Example 18

By using the composition shown in table 5, a constant velocity universal joint specimen was made in a procedure similar to that adopted in the example 20 without using the silicone-based foam stabilizer. The lubricating oil B for initial lubrication shown in table 5 was used as the lubricant for initial lubrication. The same items as those measured in the example 1 were measured on the obtained specimen. Table 5 shows the results.

TABLE 5

|  |  | Example | | | | Comparative example | | |
|---|---|---|---|---|---|---|---|---|
|  |  | 17 | 18 | 19 | 20 | 16 | 17 | 18 |
| Components of foam lubricant (wt %) | | | | | | | | |
| (a) Urethane prepolymer | Placcel EP1130 (Daicel Chemical Industries, Ltd.) | 64 | 67 | — | — | 67 | — | — |
| (b) Amine-based hardener | Iharacuamine MT (Ihara Chemical Industry Co., Ltd.) | 3.2 | 3.3 | — | — | 3.3 | — | — |
| (c) Water | Ion exchange water | 0.5 | 0.5 | 0.5 | 0.5 | 0.5 | 0.5 | 0.5 |
| (d) Silicone-based foam stabilizer | SRX298 (Dow Corning Toray Co., Ltd.) | 0.3 | 0.4 | 0.5 | 0.2 | 0.4 | 0.5 | — |
| (e) Urea-based grease | Pyronoc Universal N6C (Nippon Oil Corporation) | 31.7 | 18.4 | — | — | 18.4 | — | — |
| (f) Isocyanate | Coronate T80 (Nippon Polyurethane Industry Co., Ltd) | — | — | 8.5 | 8.5 | — | 8.5 | 8.5 |
| (g) Polyether polyol | Preminol SX4004 (Asahi Glass Co., Ltd.) | — | — | 20 | 20 | — | 20 | 20 |

TABLE 5-continued

| | | Example | | | | Comparative example | | |
|---|---|---|---|---|---|---|---|---|
| | | 17 | 18 | 19 | 20 | 16 | 17 | 18 |
| (h) Amine-based catalyst | TOYOCAT DM70 (Tosoh Corporation) | 0.3 | 0.4 | 0.5 | 0.5 | 0.4 | 0.5 | 0.5 |
| (i) Lubricating oil | Turbine 100 (Nippon Oil Corporation) | — | 10 | 70 | 70.3 | 10 | 70 | 70.5 |
| Total | | 100 | 100 | 100 | 100 | 100 | 100 | 100 |
| | Lubricant for initial lubrication | | | | | | | |
| Grease C for initial lubrication | Aromatic urea - worked penetration: 325 mineral oil  degree of detachment: 0.75 wt % | 5 g | — | 5 g | — | — | — | — |
| Lubricating oil B for initial lubrication | Superoil N460 (Nippon Oil Corporation) kinematic viscosity: 523 mm²/second (40° C.) | — | 5 g | — | 5 g | — | — | 5 g |
| Open cell ratio (%) | | 80 | 75 | 65 | 50 | 75 | 65 | 40 |
| Judgement in initial characteristic test | | ○ | ○ | ○ | ○ | X | X | ○ |
| Judgement in endurance test | | ○ | ○ | ○ | ○ | X | X | X |

As indicated in tables 4 and 5, in the examples 13 through 20, in the initial characteristic test conducted by using the constant velocity universal joint, wear which occurs owing to the shortage of a lubricant in the initial period of time was not recognized, thus favorable results were shown. In the comparative examples 13, 14, 16, and 17, in the initial characteristic test, wear was recognized at the sliding portions. Because the discharge of the lubricating component in the initial period of time was not in time, the lubricant was short. Each of the comparative example 15 and 18 was acceptable in the initial characteristic, but was unacceptable in the endurance test.

Example 21

Of the components shown in table 6, the components (a), (d), and (e) were sufficiently mixed with one another at 80° C. Thereafter the amine-based hardener (b) which dissolved at 120° C. was added to the mixture, and the components were rapidly mixed with one another. After the water (c) and the amine-based catalyst (h) were supplied to the mixture finally, the mixture was stirred. An obtained mixture was filled in an internal space of a tapered bearing (30204 produced by NTN corporation, outside diameter: 47 mm). A foaming reaction started in several seconds. After the mixture was left for 30 minutes at 100° C. to harden it, 0.3 g of the grease for initial lubrication was injected into portions in the vicinity of the rolling elements by an injector (see FIG. 13) to obtain a specimen of a bearing in which the foam lubricant was enclosed. An initial characteristic test and an endurance test shown below were conducted on the obtained specimen to measure the appearance situation of the initial characteristic thereof and the life period of time thereof. Based on the above-described method of computing the open cell ratio, the open cell ratio of the foam lubricant was measured. Table 6 shows the results.

<Initial Characteristic Test in which Bearing was Used>

To evaluate whether the desired initial characteristic was obtained, the bearing was rotated at 120° C. and 5000 rpm for 10 hours with a load of Fa=Fr=67N applied to the obtained bearing. After the test finished, the bearing was disassembled. The bearing where sliding traces were not observed at the larger end of the roller was acceptable and a mark of ○ was put thereon, where as the bearing where sliding traces were observed at the larger end thereof was unacceptable and a mark of X was put thereon.

<Endurance Test in which Bearing was Used>

The endurance test was conducted on the bearing which was acceptable in the initial characteristic test. The obtained specimen was rotated at 5000 rpm and 120° C. with a radial load of 67N and a thrust load of 67N applied thereto. The life time until an input electric current of an electric motor driving the rotational shaft exceeded a limit electric current (when rotational torque exceeded twice as large as start torque) was measured.

Example 22

Of the components shown in table 6, the components (a), (d), (e), and (i) were sufficiently mixed with one another at 80° C. Thereafter the component (b) which dissolved at 120° C. was added to the mixture, and the components were rapidly mixed with one another. After the components (c) and (h) were supplied to the mixture finally, the mixture was stirred. The obtained mixture was filled in the internal space of a tapered bearing (30204 produced by NTN corporation, outside diameter: 47 mm). A foaming reaction started in several seconds. After the mixture was left for 30 minutes at 100° C. to harden it, 0.3 g of the lubricating oil for initial lubrication was injected into portions in the vicinity of the rolling elements by an injector (see FIG. 13) to obtain a specimen of a bearing in which the foam lubricant was enclosed. The same items as those measured in the example 21 were measured on the obtained specimens. Table 6 shows the results.

Examples 23 and 24

After the silicone-based foam stabilizer (d), the lubricating oil (i), the amine-based catalyst (h), and the water (c) serving as the foaming agent were added to the polyether polyol (g) in the composition shown in table 6, the mixture was heated at 90° C. and sufficiently stirred. After the isocyanate (f) was added to the mixture, the obtained mixture was sufficiently stirred. The obtained mixture was filled in the internal space of a taper bearing (30204 produced by NTN corporation, outside diameter: 47 mm). A foaming reaction started in several seconds. After the mixture was left for 15 minutes at 90° C. to harden it, 0.3 g of the lubricant for initial lubrication shown in table 6 was injected into portions in the vicinity of the rolling elements by an injector (see FIG. 13) to obtain a specimen of each of bearings in which the foam lubricant was enclosed. The same items as those measured in the example 21 were measured on the obtained specimens. Table 6 shows the results.

Comparative Example 19

By using the composition shown in table 6, a bearing specimen was made in a procedure similar to that adopted in the example 22 without enclosing the lubricant for initial lubrication in the specimen. The same items as those measured in the example 21 were measured on the obtained specimen. Table 6 shows the results.

Comparative Example 20

By using the composition shown in table 6, a bearing specimen was made in a procedure similar to that adopted in the example 23 without enclosing the grease for initial lubrication in the specimen. The same items as those measured in the example 21 were measured on the obtained specimen. Table 6 shows the results.

Comparative Example 21

By using the composition shown in table 6, a bearing specimen was made in a procedure similar to that adopted in the example 23 without using the silicone-based foam stabilizer. The grease for initial lubrication shown in table 6 was used as the lubricant for initial lubrication. The same items as those measured in the example 21 were measured on the obtained specimen. Table 6 shows the results.

was inserted into the shaft hole 7a, the mixture was left at 100° C. for 30 minutes to foam and harden it. In this manner, the foam lubricant 9 was obtained. In the example 25, as shown in table 7, the resin component was foamed by adopting a reaction-type impregnation method of making a foaming reaction in the presence of the lubricating component contained in the mixture 9a.

TABLE 7

| Material | Wt % |
| --- | --- |
| (a) Liquid rubber: poly bd (Idemitsu Kosan Co., Ltd.) | 28 |
| (b) Isocyanate: Coronate T-80 (Nippon Polyurethane Industry) | 10 |
| (c) Water: Ion exchange water | 0.5 |
| (d) Foam stabilizer: SRX298 (Dow Corning Toray Co., Ltd.) | 0.5 |
| (e) Catalyst: Triethylenediamine (Wako Chemical Industries) | 1 |
| (f) Lubricating oil: Turbine 100 (Nippon Oil Corporation) | 60 |
| Total | 100 |

At this time, the stopper 12 was projected from the side of the shaft hole 7a opposite to the shaft member insertion side thereof and projected from the shaft member insertion side of the outer member 2. Thereby the difference (L−T) between

TABLE 6

| | | Example | | | | Comparative example | | |
| --- | --- | --- | --- | --- | --- | --- | --- | --- |
| | | 21 | 22 | 23 | 24 | 19 | 20 | 21 |
| Components of foam lubricant (wt %) | | | | | | | | |
| (a) Urethane prepolymer | Placcel EP1130 (Daicel Chemical Industries, Ltd.) | 64 | 67 | — | — | 67 | — | — |
| (b) Amine-based hardener | Iharacuamine MT (Ihara Chemical Industry Co., Ltd.) | 3.2 | 3.3 | — | — | 3.3 | — | — |
| (c) Water | Ion exchange water | 0.5 | 0.5 | 0.5 | 0.5 | 0.5 | 0.5 | 0.5 |
| (d) Silicone-based foam stabilizer | SRX298 (Dow Corning Toray Co., Ltd.) | 0.3 | 0.4 | 0.5 | 0.2 | 0.4 | 0.5 | — |
| (e) Urea-based grease | Pyronoc Universal N6C (Nippon Oil Corporation) | 31.7 | 14.2 | — | — | 14.2 | — | — |
| (f) Isocyanate | Coronate T80 (Nippon Polyurethane Industry Co., Ltd) | — | — | 8.5 | 8.5 | — | 8.5 | 8.5 |
| (g) Polyether polyol | Preminol SX4004 (Asahi Glass Co., Ltd.) | — | — | 20 | 20 | — | 20 | 20 |
| (h) Amine-based catalyst | TOYOCAT DM70 (Tosoh Corporation) | 0.3 | 0.4 | 0.5 | 0.5 | 0.4 | 0.5 | 0.5 |
| (i) Lubricating oil | Turbine 100 (Nippon Oil Corporation) | — | 14.2 | 70 | 70.3 | 14.2 | 70 | 70.5 |
| Total | | 100 | 100 | 100 | 100 | 100 | 100 | 100 |
| Lubricant for initial lubrication | | | | | | | | |
| Grease C for initial lubrication | Aromatic urea - worked penetration: 325 mineral oil degree of detachment: 0.75 wt % | 0.3 g | — | 0.3 g | — | — | — | 0.3 g |
| Lubricating oil B for initial lubrication | Superoil N460 (Nippon Oil Corporation) kinematic viscosity: 523 mm$^2$/second (40° C.) | — | 0.3 g | — | 0.3 g | — | — | — |
| Open cell ratio (%) | | 80 | 78 | 65 | 50 | 78 | 65 | 40 |
| Judgement in initial characteristic test | | ○ | ○ | ○ | ○ | X | X | X |
| Endurance test (hour) | | 300 | 280 | 250 | 240 | — | — | — |

As indicated in table 6, preferable lubricating performance can be kept in the examples 21 through 24.

Example 25

As shown in FIG. 5, a sub-assembly of a ball-fixed type constant velocity universal joint (EBJ82 produced by NTN corporation, outer diameter: 72.6 mm) which is one of fixed type constant velocity universal joints in which internal parts (cage 6, eight torque transmission members 5, and inner member 1) were incorporated inside the outer member 2 was placed vertically. Thereafter 18 g of a mixture 9a containing a resin component which composes the base component of the foam lubricant 9 having the composition shown in table 7 was rapidly injected into the shaft hole 7a of the inner member 1. As shown in FIG. 6, after the stopper 12 made of PTFE (polytetrafluoroethylene) resin, shaft-shaped, and having an axial length longer than the axial length of the shaft hole 7a the axial length (L in FIG. 6) of a portion of the stopper 12 inserted into the outer member 2 and the axial length (T in FIG. 6) thereof from the open-side end of the outer member 2, namely, from the end of the shaft member insertion side to the end of the inner member 1 at the side opposite to the shaft member insertion side thereof is set to 10 mm.

Thereafter the stopper 12 is removed from the shaft hole 7a of the inner member 1. As shown in FIG. 4, as the lubricant 10 for initial lubrication, 4 g (almost 100% of the volume of the space) of grease (commercial name: Pyronoc Universal N6C (Nippon Oil Corporation), worked penetration: 300) was injected into the space formed with the foam lubricant 9 and the end surface of the shaft hole 7a at the side opposite to the shaft member insertion side thereof. The shaft 7 was inserted into the shaft hole 7a from the open side of the outer member 2. Thereafter a boot (not shown) was mounted between the peripheral surface of the open portion of the outer member 2 and the shaft 7. The boot-mounted portion was caulked with a boot band (not shown) to fix the boot. In this manner, the production of a constant velocity universal joint having the foam lubricant 9 was completed.

INDUSTRIAL APPLICABILITY

The lubricating system of the present invention is capable of improving the lubricating component-retaining force of the foam lubricant and minimizing the amount of the exudation of the lubricating component caused by the deformation of the foam lubricant, is excellent in adaptability in the initial lubrication, has a long life, is inexpensive, and is excellent in the productivity. Therefore the lubricating system of the present invention can be preferably utilized for various rolling bearings, universal joints, and the like used in various industrial machines, cars and the like, for example, a wire-stranding machine, electromotive apparatuses, a printing machine, parts of cars, electric auxiliary machines, and building machines.

The invention claimed is:

1. A lubricating system comprising a first foam lubricant containing a lubricating component in a resin thereof which foams, hardens and becomes porous; and a second lubricant for initial lubrication wherein said second lubricant is present together with said first foam lubricant in a portion to be lubricated,
wherein in said first foam lubricant, said resin which foams, hardens and becomes porous is a rubber-like elastic substance; and said lubricating component contained in said resin has an exuding property displayed by deformation of said-rubber like elastic substance,
wherein said second lubricant for initial lubrication consists of grease having a worked penetration not less than 300 or having a degree of oil separation not less than 0.7 wt % when said grease is left 24 hours at 70° C. or consists of lubricating oil having a kinematic viscosity not less than 50 mm$^2$/second and 40° C.; and
in initial lubrication of said lubricating system, said second lubricant for initial lubrication is essentially present at a sliding portion of said portion to be lubricated,
wherein a open cell ratio of said resin which foams, hardens, and becomes porous is not less than 50%.

2. A lubricating system comprising a first foam lubricant containing a lubricating component in a resin thereof which foams, hardens and becomes porous; and a second lubricant for initial lubrication wherein said second lubricant is present together with said first foam lubricant in a portion to be lubricated,
wherein in said first foam lubricant, said resin which foams, hardens and becomes porous is a rubber-like elastic substance; and said lubricating component contained in said resin has an exuding property displayed by deformation of said-rubber like elastic substance,
wherein said second lubricant for initial lubrication consists of grease having a worked penetration not less than 300 or having a degree of oil separation not less than 0.7 wt % when said grease is left 24 hours at 70° C. or consist of lubricating oil having a kinematic viscosity not less than 50 mm$^2$/second and 40° C.; and
in initial lubrication of said lubricating system, said second lubricant for initial lubrication is essentially present at a sliding portion of said portion to be lubricated,
wherein a foaming magnification of said resin is 1.1 to 100.

3. A bearing utilizing the lubricating system according to claim 1 or 2, wherein said first foam lubricant and said second lubricant for initial lubrication are present together in an inside of said bearing, which is a portion to be lubricated; and
in initial lubrication of said bearing, said second lubricant for initial lubrication is present at a sliding portion of said bearing.

4. The bearing according to claim 3 being a rolling bearing.

5. Currently amended): A bearing utilizing the lubricating system according to claim 1 or 2, wherein said first foam lubricant and said second lubricant for initial lubrication are present together in an inside of said bearing, which is a portion to be lubricated; and
in initial lubrication of said bearing, said second lubricant for initial lubrication is present at a rolling portion of said bearing in addition to said sliding portion.

6. The lubricating system according to claim 1 or 2, wherein said resin which foams, harden and becomes porous is polyurethane resin.

7. A universal joint in which a lubricating system is utilized, said lubricating system comprising a first foam lubricant containing a lubricating component in a resin thereof which foams, hardens, and becomes porous; and a second lubricant for initial lubrication wherein said second lubricant is present together with said first foam lubricant a portion to be lubricated, wherein in said first foam lubricant, said resin which foams, hardens and becomes porous is a rubber-like elastic substance; and said lubricating component contained in said resin has an exuding property displayed by deformation of said rubber-like elastic substance, wherein said second lubricant for initial lubrication consists of grease having a worked penetration no less than 300 or having a degree of oil separation not less than 0.7 wt % when said grease is left at 70° C. or consists of lubricating oil having a kinematic viscosity not less than 50 mm$^2$/second at 40° C.; and in initial lubrication of said lubricating system, said second lubricant for initial lubrication is essentially present at a sliding portion of said portion to be lubricated,
wherein a rotational torque is transmitted owing to engagement between track grooves and torque transmission members provided on an outer member and an inner member; said torque transmission members roll along said track grooves to allow said torque transmission members to move in an axial direction; and said first foam lubricant and said second lubricant for initial lubrication are present together in an inside of said universal joint, which is a portion to be lubricated, and
in initial lubrication of said universal joint, said second lubricant for initial lubrication is present in a rolling portion of said universal joint in addition to said sliding portion.

8. A universal joint in which a lubricating system is utilized, said lubricating system comprising a first foam lubricant containing a lubricating component in a resin thereof which foams, hardens, and becomes porous; and a second lubricant foir initial lubrication wherein said second lubricant is present together with said first foam lubricant a portion to be lubricated, wherein in said first foam lubricant, said resin which foams, hardens and becomes porous is a rubber-like elastic substance; and said lubricating component contained in said resin has an exuding property displayed by deformation of said rubber-like elastic substance, wherein said second lubricant for initial lubrications consist of grease having a worked penetration not less than 300 or having a degree of oil separation not less than 0.7 wt % when said grease is left at 70° C. or consists of lubricating oil having a kinematic viscosity not less than 50 mm$^2$/second at 40° C.; and in initial lubrication of said lubricating system, said second lubricant for initial lubrication is essentially present at a sliding portion of said portion to be lubricated, wherein a rotational torque is transmitted owing to engagement between track grooves and torque transmission members provided on an outer member and an inner member; said torque transmission members roll along said track grooves to allow said torque transmission members to move in an axial direction; and said first foam lubricant and said second lubricant for initial lubrication are present together in an inside of said universal joint, which is a portion to be lubricated, and in initial lubrication of said universal joint, said second lubricant for initial lubrication is present in a sliding portion of said universal joint.

9. The universal joint according to claim 8 being a constant velocity universal joint.

10. A process for producing the universal joint according to claim 8, comprising the steps of:
enclosing said second lubricant for initial lubrication inside said universal join joint;
filling a mixture essentially containing a resin which foams, hardens, and becomes porous and a lubricating component inside said universal joint in which said second lubricant for initial lubrication is enclosed; and
foaming and hardening said mixture to form said first foam lubricant.

11. The process for producing the universal joint, according to claim 10, wherein at said step of enclosing said second lubricant for initial lubrication inside said universal joint, said second lubricant for initial lubrication is enclosed at a bottom portion of said outer member of said universal joint.

12. The process for producing the universal joint, according to claim 10, wherein at said foaming and hardening step, said mixture is filled between said outer member and said inner member from a shaft hole of said inner member of said universal joint; and after said shaft hole of said inner member is closed by a shaft or a shaft-shaped stopper, said mixture is foamed and hardened to form said first foam lubricant.

13. A process for producing the universal joint according to claim 8, comprising the steps of:
filling a mixture essentially containing a resin which foams, hardens, and becomes porous and a lubricating component inside said universal joint;
foaming and hardening said mixture to form said first foam lubricant; and
injecting said second lubricant for initial lubrication inside said universal joint.

14. The process for producing the universal joint, according to claim 13, wherein at said step of injecting said second lubricant for initial lubrication inside said universal joint, said second lubricant for initial lubrication is injected into a space formed through a shaft hole of said inner member by removing said stopper after said foaming and hardening step finishes.

15. The process for producing the universal joint, according to claim 14, wherein said stopper has a flange covering an end of said outer member at an open side thereof.

16. The process for producing the universal joint, according to claim 15, wherein an air hole is formed through said flange.

* * * * *